US010877437B2

(12) United States Patent
Gelman et al.

(10) Patent No.: US 10,877,437 B2
(45) Date of Patent: Dec. 29, 2020

(54) ZERO ORDER BLOCKING AND DIVERGING FOR HOLOGRAPHIC IMAGING

(71) Applicant: Real View Imaging Ltd., Yokneam (IL)

(72) Inventors: Shaul Alexander Gelman, Raanana (IL); Shlomo Alon-Braitbart, Haifa (IL); Barry Loevsky, Yokneam Ilit (IL); Or Peleg, Adi (IL); Carmel Rotschild, Ganei-Tikva (IL)

(73) Assignee: Real View imaging Ltd., Yokneam (IL)

( * ) Notice: Subject to any disclaimer, the term of this patent is extended or adjusted under 35 U.S.C. 154(b) by 153 days.

(21) Appl. No.: 16/106,249

(22) Filed: Aug. 21, 2018

(65) Prior Publication Data

US 2019/0004478 A1  Jan. 3, 2019

Related U.S. Application Data

(63) Continuation-in-part of application No. PCT/IL2017/050228, filed on Feb. 22, 2017.
(Continued)

(51) Int. Cl.
*G03H 1/22* (2006.01)

(52) U.S. Cl.
CPC ......... *G03H 1/2205* (2013.01); *G03H 1/2294* (2013.01); *G03H 2001/221* (2013.01);
(Continued)

(58) Field of Classification Search
CPC ............... G03H 1/2205; G03H 1/2249; G03H 2001/2207; G03H 2001/221; G03H 2001/2234
See application file for complete search history.

(56) References Cited

U.S. PATENT DOCUMENTS 3,800,298 A   3/1974  Ogura et al.
4,978,952 A   12/1990 Irwin
(Continued)

FOREIGN PATENT DOCUMENTS

GB   2472773   3/2011
GB   2507462   5/2014
(Continued)

OTHER PUBLICATIONS

Interview Summary dated Mar. 23, 2020 from the U.S. Appl. No. 16/078,638. (3 pages).
(Continued)

*Primary Examiner* — Robert E. Tallman

(57) ABSTRACT

A method for directing non-modulated light from a Spatial Light Modulator (SLM) and allowing through modulated light for producing an interference based holographic image, the method including illuminating the SLM with coherent light, thereby producing a mix of light modulated by the SLM and light not modulated by the SLM, and projecting the mix of the modulated light and the not modulated light along an optical axis onto a volume grating, wherein the volume grating directs the not modulated light away from the holographic image and allows through modulated light for producing the holographic image. Related apparatus and methods are also described.

16 Claims, 26 Drawing Sheets

Related U.S. Application Data

(60) Provisional application No. 62/549,105, filed on Aug. 23, 2017, provisional application No. 62/298,036, filed on Feb. 22, 2016.

(52) U.S. Cl.
CPC ............ *G03H 2001/2207* (2013.01); *G03H 2001/2234* (2013.01); *G03H 2222/18* (2013.01); *G03H 2223/18* (2013.01); *G03H 2223/23* (2013.01); *G03H 2223/24* (2013.01); *G03H 2225/31* (2013.01); *G03H 2225/52* (2013.01); *G03H 2225/60* (2013.01)

(56) References Cited

U.S. PATENT DOCUMENTS

| | | | |
|---|---|---|---|
| 5,369,511 A * | 11/1994 | Amos | G02B 5/001 359/107 |
| 5,673,146 A | 9/1997 | Kelly | |
| 5,844,709 A | 12/1998 | Rabinovich et al. | |
| 5,883,743 A | 3/1999 | Sloan | |
| 6,101,007 A | 8/2000 | Yamasaki et al. | |
| 6,876,878 B2 | 4/2005 | Zhdanov | |
| 6,906,836 B2 | 6/2005 | Parker et al. | |
| 7,259,898 B2 | 8/2007 | Khazova et al. | |
| 7,522,344 B1 | 4/2009 | Curatu et al. | |
| 7,639,208 B1 | 12/2009 | Ha et al. | |
| 7,675,684 B1 | 3/2010 | Weissman et al. | |
| 8,159,733 B2 | 4/2012 | Christmas et al. | |
| 8,213,064 B2 | 7/2012 | Yona et al. | |
| 8,500,284 B2 | 8/2013 | Rotschild et al. | |
| 8,576,276 B2 | 11/2013 | Bar-Zeev et al. | |
| 8,976,170 B2 | 3/2015 | Lee et al. | |
| 8,982,471 B1 | 3/2015 | Starner et al. | |
| 9,225,969 B2 | 12/2015 | Aguirre-Valencia | |
| 2003/0197933 A1 | 10/2003 | Sudo et al. | |
| 2004/0066547 A1 | 4/2004 | Parker et al. | |
| 2004/0150888 A1 | 8/2004 | Domjan et al. | |
| 2005/0013005 A1 | 1/2005 | Rogers | |
| 2006/0176242 A1 | 8/2006 | Jaramaz et al. | |
| 2007/0177275 A1 | 8/2007 | McGuire, Jr. | |
| 2008/0013793 A1 | 1/2008 | Hillis et al. | |
| 2008/0174659 A1 | 7/2008 | McDowall | |
| 2009/0002787 A1 | 1/2009 | Cable et al. | |
| 2009/0164930 A1 | 6/2009 | Chen et al. | |
| 2009/0237759 A1 | 9/2009 | Maschke | |
| 2009/0238060 A1 | 9/2009 | Yasuda et al. | |
| 2010/0110368 A1 | 5/2010 | Chaum | |
| 2010/0133424 A1 | 6/2010 | Lindsay | |
| 2010/0238270 A1 | 9/2010 | Bjelkhagen et al. | |
| 2011/0128555 A1 | 6/2011 | Rotschild et al. | |
| 2011/0157667 A1 | 6/2011 | Lacoste et al. | |
| 2012/0052946 A1 | 3/2012 | Yun | |
| 2012/0139817 A1 | 6/2012 | Freeman | |
| 2012/0140038 A1 | 6/2012 | Bi et al. | |
| 2012/0188619 A1 | 7/2012 | Song et al. | |
| 2012/0224062 A1 | 9/2012 | Lacoste et al. | |
| 2013/0137076 A1 | 5/2013 | Perez et al. | |
| 2013/0222384 A1 | 8/2013 | Futterer | |
| 2013/0265622 A1 | 10/2013 | Christmas et al. | |
| 2013/0300728 A1 | 11/2013 | Reichow et al. | |
| 2013/0326364 A1 | 12/2013 | Latta et al. | |
| 2014/0002367 A1 | 1/2014 | Glückstad et al. | |
| 2014/0033052 A1 | 1/2014 | Kaufman et al. | |
| 2014/0146394 A1 | 5/2014 | Tout et al. | |
| 2014/0160543 A1 | 6/2014 | Putilin et al. | |
| 2014/0372944 A1 | 12/2014 | Mulcahy et al. | |
| 2015/0016777 A1 | 1/2015 | Abovitz et al. | |
| 2015/0168914 A1 | 6/2015 | Gelman et al. | |
| 2015/0206350 A1 | 7/2015 | Gardes et al. | |
| 2015/0234095 A1 | 8/2015 | Schowengerdt | |
| 2015/0250450 A1 | 9/2015 | Thomas et al. | |
| 2015/0332508 A1 | 11/2015 | Jovanovic | |
| 2015/0378080 A1 * | 12/2015 | Georgiou | G02B 5/32 349/62 |
| 2016/0033771 A1 | 2/2016 | Tremblay et al. | |
| 2016/0077344 A1 | 3/2016 | Burns | |
| 2016/0143528 A1 | 5/2016 | Wilf et al. | |
| 2016/0147308 A1 | 5/2016 | Gelman et al. | |
| 2016/0216515 A1 | 7/2016 | Bouchier et al. | |
| 2016/0223986 A1 | 8/2016 | Archambeau et al. | |
| 2016/0260441 A1 | 9/2016 | Muehlhausen et al. | |
| 2016/0360187 A1 | 12/2016 | Smithwick et al. | |
| 2016/0366399 A1 | 12/2016 | Tempel et al. | |
| 2016/0379606 A1 | 12/2016 | Kollin et al. | |
| 2017/0052373 A1 | 2/2017 | Memmott et al. | |
| 2017/0078652 A1 | 3/2017 | Hua et al. | |
| 2019/0049899 A1 | 2/2019 | Gelman et al. | |
| 2019/0056693 A1 | 2/2019 | Gelman et al. | |
| 2019/0155033 A1 | 5/2019 | Gelman et al. | |
| 2020/0184865 A1 | 6/2020 | Loevsky et al. | |
| 2020/0201038 A1 | 6/2020 | Gelman et al. | |

FOREIGN PATENT DOCUMENTS

| | | |
|---|---|---|
| WO | WO 2005/045531 | 5/2005 |
| WO | WO 2006/008734 | 1/2006 |
| WO | WO 2009/126264 | 10/2009 |
| WO | WO 2009/156752 | 12/2009 |
| WO | WO 2011/018655 | 2/2011 |
| WO | WO 2012/062681 | 5/2012 |
| WO | WO 2012/166593 | 12/2012 |
| WO | WO 2013/112705 | 8/2013 |
| WO | WO 2013/163347 | 10/2013 |
| WO | WO 2014/106823 | 7/2014 |
| WO | WO 2014/155288 | 10/2014 |
| WO | WO 2014/186620 | 11/2014 |
| WO | WO 2015/004670 | 1/2015 |
| WO | WO 2015/164402 | 10/2015 |
| WO | WO 2016/010289 | 1/2016 |
| WO | WO 2016/105281 | 6/2016 |
| WO | WO 2016/105282 | 6/2016 |
| WO | WO 2016/105285 | 6/2016 |
| WO | WO 2016/144459 | 9/2016 |
| WO | WO 2016/156614 | 10/2016 |
| WO | WO 2007/145156 | 8/2017 |
| WO | WO 2017/145154 | 8/2017 |
| WO | WO 2017/145155 | 8/2017 |
| WO | WO 2017/145156 | 8/2017 |
| WO | WO 2017/145158 | 8/2017 |
| WO | WO 2018/154564 | 8/2018 |
| WO | WO 2018/211494 | 11/2018 |

OTHER PUBLICATIONS

Communication Relating to the Results of the Partial International Search and Provisional Opinion dated May 8, 2017 From the International Searching Authority Re. Application No. PCT/IL2017/050226. (16 Pages).

Communication Relating to the Results of the Partial International Search and the Provisional Opinion dated May 15, 2017 From the International Searching Authority Re. Application No. PCT/IL2017/050228. (14 Pages).

International Preliminary Report on Patentability dated Sep. 7, 2018 From the International Bureau of WIPO Re. Application No. IL2017/050228. (11 Pages).

International Preliminary Report on Patentability dated Sep. 7, 2018 From the International Bureau of WIPO Re. Application No. PCT/IL2017/050225. (10 Pages).

International Preliminary Report on Patentability dated Sep. 7, 2018 From the International Bureau of WIPO Re. Application No. PCT/IL2017/050226. (14 Pages).

International Search Report and the Written Opinion dated May 4, 2017 From the International Searching Authority Re. Application No. PCT/IL2017/050225. (16 Pages).

International Search Report and the Written Opinion dated Sep. 7, 2017 From the International Searching Authority Re. Application No. PCT/IL2017/050226. (21 Pages).

International Search Report and the Written Opinion dated Jul. 9, 2018 From the International Searching Authority Re. Application No. PCT/IL2018/050186. (19 Pages).

(56) References Cited

OTHER PUBLICATIONS

International Search Report and the Written Opinion dated Aug. 10, 2017 From the International Searching Authority Re. Application No. IL2017/050228. (17 Pages).
International Search Report and the Written Opinion dated Sep. 25, 2018 From the International Searching Authority Re. Application No. PCT/IL2018/050509. (24 Pages).
International Search Report and the Written Opinion dated Apr. 26, 2017 From the International Searching Authority Re. Application No. PCT/IL2017/050224. (14 Pages).
International Search Report and the Written Opinion dated Jun. 29, 2017 From the International Searching Authority Re. Application No. PCT/IL2017/050226. (20 Pages).
Bimber "Holographics Combining Holograms With Interactive Computer Graphics", Retrieved From Holographer.org, 32 P., Apr. 2004.
Bimber "HoloGraphics: Combining Holograms With Interactive Computer Graphics", Retrieved From Holographer.org, p. 1-9, Apr. 2004.
Bimber "Merging Graphics and Holograms", Journal of Holography and Speckle, 3(2): 1-7, Dec. 2006.
Bimber et al. "Interacting With Augmented Holograms", Integrated Optoelectronic Devices, 2005: 41-54, Apr. 21, 2005.
Duchowski et al. "Measuring Gaze Depth With an Eye Tracker During Stereoscopic Display", Proceeding of the ACM SIGGRAPH Symposium on Applied Perception in Graphics and Visualization, APGV'1 1, Toulouse, France, Aug. 27-28, 2011, p. 15-22, Aug. 27, 2011.
Galeotti et al. "In-Situ Visualization of Medical Images Using Holographic Optics", Proceedings of the Augmented Environments for Medical Imaging Including Augmented Reality in Computer-Aided Surgery (AMI ARCS), at Medical Image Computing and Computer-Assisted Intervention (MICCAI), New York City, p. 93-103, Sep. 10, 2008.
Goodman "Computer-Generated Holograms", Introduction to Fourier Optics, 3rd Ed., Chap.9.9: 355-359, 2005.
Jud et al. "Motion Tracking Systems. An Overview of Motion Tracking Methods", Studies on Mechatronics, Swiss Federal Institute of Technology Zurich, Switzerland, ETH, Chap.1-5: 1-81, Spring 2011.
Liao et al. "3-D Augmented Reality for MRI-Guided Surgery Using Integral Videography Autostereoscopic Image Overlay", IEEE Transactions on Biomedical Engineering, XP011343257, 57(6): 1476-1486, Jun. 2010.
Moon et al. "Holographic Head-Mounted Display With RGB Light Emitting Diode Light Source", Optics Express, 22(6): 6526-6534, Published Online Mar. 13, 2014.
Yeh "Optics of Periodic Layered Media: Bragg Reflectors", Optical Waves in Layered Media, Chap.6.3: 128-134, Feb. 2005.
Official Action dated Dec. 27, 2019 From the U.S. Appl. No. 16/078,638. (32 pages).
Official Action dated Oct. 28, 2019 From the U.S. Appl. No. 16/078,639. (29 Pages).
International Preliminary Report on Patentability dated Sep. 6, 2019 From the International Bureau of WIPO Re. Application No. PCT/IL2018/050186. (11 Pages).
Communication Pursuant to Article 94(3) EPC dated Jul. 19, 2019 From the European Patent Office Re. Application No. 17714566.1. (5 Pages).
Communication Pursuant to Article 94(3) EPC dated Jul. 30, 2019 From the European Patent Office Re. Application No. 17712554.9. (5 Pages)
Nicolau et al. "An Augmented Reality System for Liver Theraml Ablation: Design and Evaluation on Clinical Cases", Medical Image Analysis, 13(3): 494-506, Available Online Feb. 20, 2009.
Nicolau et al. "Augmented Reality in Laparoscopic Surgical Oncology", Surgical Oncology, 20(3): 189-201, Sep. 2011.
International Preliminary Report on Patentability dated Nov. 28, 2019 From the International Bureau of WIPO Re. Application No. PCT/IL2018/050509. (16 Pages).
Communication Pursuant to Article 94(3) EPC dated Apr. 28, 2020 From the European Patent Office Re. Application No. 17712554.9. (5 Pages).
Restriction Official Action dated May 18, 2020 from the U.S. Appl. No. 16/078,653. (8 pages).
Communication Pursuant to Article 94(3) EPC dated Mar. 27, 2020 From the European Patent Office Re. Application No. 17714566.1. (5 Pages).

* cited by examiner

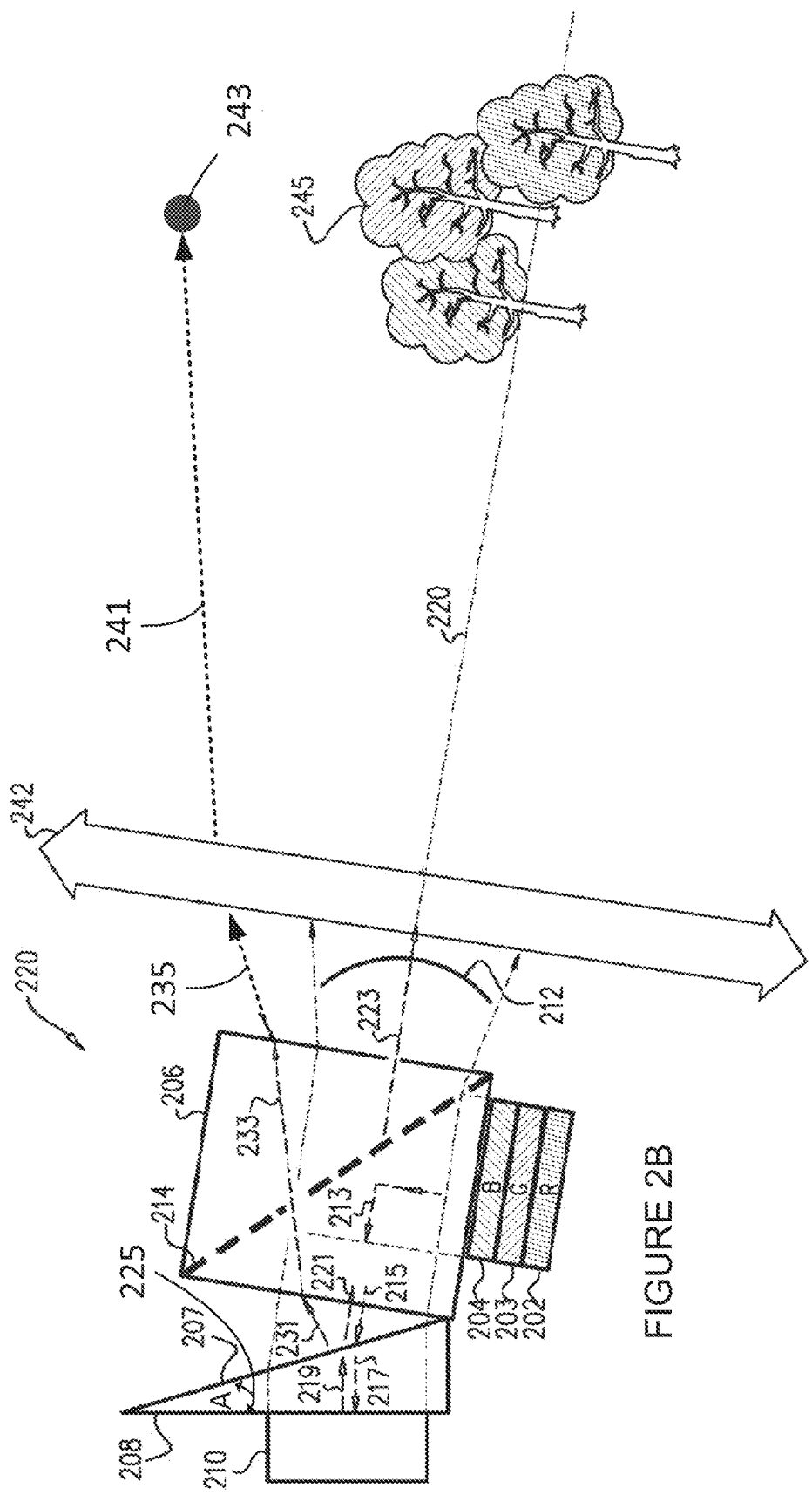

ZERO ORDER BLOCKING AND DIVERGING FOR HOLOGRAPHIC IMAGING

RELATED APPLICATIONS

This application is a Continuation-In-Part (CIP) of PCT Patent Application No. PCT/IL2017/050228 filed on Feb. 22, 2017, which claims benefit of priority under 35 USC 119(e) of U.S. Provisional Patent Application No. 62/298,036 filed on Feb. 22, 2016.

This application also claims the benefit of priority under 35 USC 119(e) of U.S. Provisional Patent Application No. 62/549,105 filed on Aug. 23, 2017.

The contents of the above applications are all incorporated by reference as if fully set forth herein in their entirety.

FIELD AND BACKGROUND OF THE INVENTION

The present invention, in some embodiments thereof, relates to methods and devices for reducing an effect of a zero order diffraction bright spot on quality of a displayed image.

Some images, such as, by way of a non-limiting example, Fourier holographic images, have a zero-order diffraction [ZOD] bright spot, and possibly bright areas caused by higher order diffractions, within image space, at a focal plane within image space. The bright spot within image space can significantly reduce the image quality perceived by a viewer.

Additional background art includes:

U.S. Patent Application Publication No. 2013/0265622 of Christmas et al;

U.S. Pat. No. 8,159,733 to Christmas et al;

U.S. Pat. No. 3,800,298 to Ogura et al; and

"Optical Waves in Layered Media", Pochi Yeh, Wiley, 3 Mar. 2005—Science, pages 129-134.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to methods and devices for reducing an effect of a zero order diffraction bright spot on quality of a displayed image.

In some embodiments a combination of methods and devices are used, each optionally alleviating part of the problem, and together alleviating a greater part of the problem.

According to an aspect of some embodiments of the present invention there is provided a method for blocking non-modulated light from a Spatial Light Modulator (SLM) and allowing through modulated light for producing an interference based holographic image, the method including illuminating the SLM with coherent light, thereby producing a mix of light modulated by the SLM and light not modulated by the SLM, and projecting the mix of the modulated light and the not modulated light along an optical axis onto a distributed Bragg reflector (DBR), wherein the DBR reflects the not modulated light and allows through modulated light which is at an angle to the optical axis.

According to some embodiments of the invention, the illuminating the SLM is by a plane wave coherent light propagating at a direction normal to a plane of the SLM, and the projecting the mix of light is at a direction normal to a plane of the DBR.

According to some embodiments of the invention, the DBR allows through modulated light which is at an angle to the optical axis which is greater than 1 milliradian.

According to some embodiments of the invention, DBR planes are tilted at an angle to the optical axis which is greater than 10 degrees.

According to an aspect of some embodiments of the present invention there is provided a display for displaying an interference based holographic image and blocking a Zero Order Diffraction (ZOD) bright spot associated with the holographic image, including a Spatial Light Monitor (SLM), a coherent light illuminator for illuminating the SLM with coherent light, thereby producing a mix of modulated light for displaying a holographic image and not modulated light, and a distributed Bragg reflector (DBR) for reflecting the not modulated light and allowing through the modulated light for displaying the holographic image.

According to some embodiments of the invention, the DBR is placed between the SLM and any other optical focusing element.

According to some embodiments of the invention, the DBR is designed to allow through modulated light which is at an angle to the optical axis which is greater than 1 milliradian.

According to some embodiments of the invention, DBR planes are tilted at an angle to the optical axis which is greater than 10 degrees.

According to an aspect of some embodiments of the present invention there is provided a method for reducing Zero Order Diffraction (ZOD) bright spot intensity in Spatial Light Modulator (SLM) projection of interference based holographic images including illuminating a SLM with coherent light, thereby producing modulated light, and passing the modulated light through an apodization filter, producing apodized modulated light, and using the apodized modulated light to produce an interference based holographic image.

According to some embodiments of the invention, the apodization provides a smooth reduction of the modulated light intensity from zero intensity along edges of an area of the modulated light, to full intensity away from the edges.

According to some embodiments of the invention, the apodization provides a smooth reduction of the modulated light intensity to 5% intensity along a distance of 2 to 500 wavelengths of the light.

According to some embodiments of the invention, the apodization provides an average of 50% reduction of intensity in an area at a distance of 2 to 500 wavelengths to edges defined by 5% intensity of the light.

According to some embodiments of the invention, the apodization provides a smooth reduction of the modulated light intensity to 5% intensity along a distance of 1 to 250 microns normal to edges of an area of the modulated light, from full intensity away from the edges.

According to an aspect of some embodiments of the present invention there is provided a method for reducing Zero Order Diffraction (ZOD) bright spot intensity in Spatial Light Modulator (SLM) projection of holographic images including illuminating a SLM with coherent light, by passing the illuminating light through an apodization filter, thereby producing apodized modulated light, and using the apodized modulated light to produce a holographic image.

According to some embodiments of the invention, the apodization provides a smooth reduction of the illuminating light intensity from zero intensity along edges of an area of the illuminating light, to full intensity away from the edges.

According to some embodiments of the invention, the apodization provides a smooth reduction of the illuminating light intensity to 5% intensity along a distance of 2 to 500 wavelengths of the light.

According to some embodiments of the invention, the apodization provides an average of 50% reduction of the illuminating light intensity in an area at a distance of 2 to 500 wavelengths to edges of 5% intensity of the illuminating light.

According to an aspect of some embodiments of the present invention there is provided a display for displaying an interference based holographic image and reducing an intensity of a Zero Order Diffraction (ZOD) bright spot associated with the holographic image, including a Spatial Light Monitor (SLM), a coherent light illuminator for illuminating the SLM thereby producing modulated light for displaying a holographic image, and an apodization filter for apodizing the modulated light thereby producing apodized modulated light, thereby producing apodized modulated light for producing an interference based holographic image with a reduced intensity ZOD bright spot.

According to some embodiments of the invention, the apodization filter is placed between the coherent light illuminator and the SLM.

According to some embodiments of the invention, the apodization filter is placed closer to a face of the SLM than to the coherent light illuminator.

According to some embodiments of the invention, the apodization filter is placed adjacent to a face of the SLM.

According to some embodiments of the invention, the apodization filter is placed at a distance corresponding to not less than a Fresnel number 50 from the SLM.

According to some embodiments of the invention, the apodization filter is placed at a location of an image of the SLM.

According to some embodiments of the invention, the apodization filter is placed at a distance corresponding to not less than a Fresnel number 50 from the location of the image of the SLM.

According to some embodiments of the invention, an image of the apodization filter is imaged at the SLM.

According to some embodiments of the invention, the image of the apodization filter is imaged at a distance not greater than 70 millimeters from the SLM.

According to some embodiments of the invention, the apodization filter provides a smooth reduction of intensity of light passing through the apodization filter to 5% intensity along edges of the apodization filter, from full intensity away from the edges.

According to some embodiments of the invention, the apodization filter provides a smooth reduction of the intensity of light passing through the apodization filter to 5% intensity along edges of the apodization filter, from full intensity, along a distance of 2 to 500 wavelengths of the light.

According to some embodiments of the invention, the apodization filter provides an average of 50% reduction of intensity of light passing through the apodization filter in an area at a distance of 2 to 500 wavelengths from edges of the apodization filter.

According to an aspect of some embodiments of the present invention there is provided a method for directing light reflected from a Spatial Light Modulator (SLM) away from a direction of projecting an interference based holographic image generated by the SLM, the method including placing a transparent component next to the SLM, with a first side of the transparent component facing the SLM and a second side at an angle to a plane of the SLM, illuminating the SLM with coherent light, through the transparent component, thereby producing reflected modulated light, and projecting the reflected modulated light along an optical axis and focusing the reflected modulated light along the optical axis, producing an interference based holographic image, wherein reflections from the second side of the transparent component are reflected at an angle to the optical axis larger than a diffraction angle of the transparent component.

According to some embodiments of the invention, further including matching an index of refraction of the transparent component with an index of refraction matched of the SLM.

According to some embodiments of the invention, the placing the transparent component includes placing a plurality of transparent components, each one of the transparent components with a first side facing the SLM and a second side at an angle to a plane of the SLM.

According to some embodiments of the invention, the placing the transparent component includes placing a blazed grating transparent component, the blazed grating including a flat first side facing the SLM and a blazed grating on a second side, the blazing producing a plurality of planes at an angle to a plane of the SLM.

According to some embodiments of the invention, an angle A of the second side of the transparent component to the plane of the SLM is greater than 0.1 degrees.

According to an aspect of some embodiments of the present invention there is provided a display for interference based holographic images including a Spatial Light Modulator (SLM), and a transparent component next to an active side of the SLM, with a first side of the transparent component facing the SLM and a second side at an angle to a plane of the SLM.

According to some embodiments of the invention, a head angle A of the transparent component between the first side of the transparent component and the second side of the transparent component is greater than $\frac{1}{3}*\theta_{diff}$, where $\theta_{diff}$ is an angle of diffraction in the transparent component.

According to some embodiments of the invention, further including the transparent component having an index of refraction matched to an index of refraction of the SLM.

According to some embodiments of the invention, further including placing index matching material between the transparent component and the SLM, to provide index matching between the transparent component and the SLM.

According to some embodiments of the invention, the index matching material is an index matching liquid.

According to some embodiments of the invention, the transparent component includes a transparent electrode.

According to some embodiments of the invention, the transparent component includes a transparent layer attached to the SLM.

According to some embodiments of the invention, the transparent component includes a plurality of transparent components, each one of the transparent components with a first side facing the SLM and a second side at an angle to a plane of the SLM.

According to some embodiments of the invention, the transparent component includes a blazed grating transparent component, the blazed grating including a flat first side facing the SLM and a blazed grating on a second side, the blazing producing a plurality of planes at an angle to a plane of the SLM.

According to some embodiments of the invention, an angle A of the second side of the transparent component to the plane of the SLM is greater than 0.5 degrees.

According to some embodiments of the invention, the SLM includes pixels, each pixel including a wedge shaped transparent component, having a first side facing a first side of the SLM and a second side facing a direction of illumination of the SLM, the second side of the pixel at an angle to a plane of the first side of the pixel.

According to some embodiments of the invention, an optical path difference induced by the wedge shape of the pixel is compensated by varying electric potential along the pixel.

According to an aspect of some embodiments of the present invention there is provided a method for improving a display of an interference based computer generated holographic (CGH) image including illuminating a Spatial Light Modulator (SLM) with coherent light, setting SLM pixel values to modulate the coherent light, producing modulated light for displaying a CGH image, and displaying the interference based CGH image, and further including reducing an effect of a Zero Order Diffraction (ZOD) bright spot on the CGH image by performing at least one action from a group consisting of apodizing the illuminating the SLM, illuminating the SLM at an angle to a normal of a face of the SLM, redirecting light reflected from a face of the SLM to a different direction than light modulated by the SLM, apodizing light modulated by the SLM, shifting a location of the ZOD bright spot along an optical axis of the displaying the CGH image, shifting a location of the ZOD bright spot sideways relative to the optical axis of the displaying the CGH image, blocking light which produces the ZOD bright spot, and blocking light which produces the ZOD bright spot and also filling-in a dark spot produced by the blocking.

According to some embodiments of the invention, the reducing the effect of the ZOD bright spot includes performing more than one action from the group.

According to an aspect of some embodiments of the present invention there is provided a display for computer generated interference based holographic images including a Spatial Light Modulator (SLM), and one or more optical elements arranged to image an interference based holographic image along an optical axis and focus the holographic image at a first distance along the optical axis, wherein the one or more optical elements are arranged to image a Zero Order Diffraction (ZOD) bright spot away from a location along the optical axis where the holographic image is in focus.

According to some embodiments of the invention, the one or more optical elements are arranged to image the ZOD bright spot at optical infinity.

According to some embodiments of the invention, the one or more optical elements are arranged to image the ZOD bright spot at minus optical infinity.

According to some embodiments of the invention, the SLM and the one or more optical elements are arranged to produce a three-dimensional (3D) Fourier holographic image.

According to some embodiments of the invention, the SLM and the one or more optical elements are arranged to produce a two-dimensional (2D) Fourier holographic image.

According to an aspect of some embodiments of the present invention there is provided a method for displaying interference based holographic images including illuminating a Spatial Light Modulator (SLM) with coherent light, thereby producing modulated light, and projecting the modulated light through one or more optical elements arranged to image a holographic image along an optical axis and focus the holographic image at a first distance along the optical axis, producing an interference based holographic image, and wherein the producing the holographic image further includes imaging the holographic image at a different distance along the optical axis than where a Zero Order Diffraction (ZOD) bright spot is imaged.

According to some embodiments of the invention, further including imaging the ZOD bright spot at optical infinity.

According to some embodiments of the invention, further including imaging the ZOD bright spot at minus optical infinity.

According to some embodiments of the invention, further including imaging the ZOD bright spot at a distance of less than 70 millimeters from an observer's eye.

According to some embodiments of the invention, further including imaging the ZOD bright spot at an observer's eye.

According to some embodiments of the invention, further including imaging the holographic image at a distance along the optical axis which is closer to a viewer than a focal plane of the ZOD bright spot.

According to some embodiments of the invention, further including imaging the holographic image at a distance along the optical axis which is further from a viewer than a focal plane of the ZOD bright spot.

According to some embodiments of the invention, the SLM and the one or more optical elements are arranged to produce a three-dimensional (3D) Fourier holographic image.

According to some embodiments of the invention, the SLM and the one or more optical elements are arranged to produce a two-dimensional (2D) Fourier holographic image.

According to an aspect of some embodiments of the present invention there is provided a display for interference based holographic images including a Spatial Light Modulator (SLM), one or more focusing optical elements arranged to image an interference based holographic image along an optical axis and focus the holographic image at a first distance along the optical axis, and a Zero Order Diffraction (ZOD) blocking element at a location at a second distance along the optical axis, wherein the one or more focusing optical elements are arranged to image the holographic image at the first distance so that the ZOD blocking element is not within the holographic image.

According to some embodiments of the invention, the holographic image is a three-dimensional (3D) holographic image, and the ZOD blocking element is arranged to be at a location which is not within a space where the holographic image is in focus.

According to an aspect of some embodiments of the present invention there is provided a method for displaying an interference based holographic image including illuminating a Spatial Light Modulator (SLM) with coherent light, thereby producing modulated light, and projecting the modulated light through one or more focusing optical elements arranged to image a holographic image along an optical axis and focus the holographic image at a first distance along the optical axis, producing an interference based holographic image, and wherein the one or more focusing optical elements are arranged to image a Zero Order Diffraction (ZOD) bright spot away from a location along the optical axis where the holographic image is in focus.

According to some embodiments of the invention, the holographic image is a three-dimensional (3D) holographic image, and the ZOD blocking element is arranged to be at a location which is not within a space where the holographic image is in focus.

According to an aspect of some embodiments of the present invention there is provided a method for displaying an interference based holographic image including illuminating a Spatial Light Modulator (SLM) with coherent light, thereby producing modulated light, and projecting the modulated light through one or more optical elements arranged to image a holographic image along an optical axis and focus the holographic image at a first distance along the optical axis, producing an interference based holographic image, blocking a Zero Order Diffraction (ZOD) bright spot in the holographic image producing a dark spot in the holographic image, and providing light to illuminate the dark spot.

According to some embodiments of the invention, the providing light to illuminate the dark spot includes providing a uniform spot of light to illuminate the dark spot.

According to some embodiments of the invention, an intensity of illumination of the uniform spot of light used to illuminate the dark spot is equal to an average brightness of the holographic image which is produced to appear in the area of the blocked spot.

According to some embodiments of the invention, the providing light to illuminate the dark spot includes providing a two-dimensional (2D) image corresponding to the holographic image produced to appear at the blocked spot.

According to some embodiments of the invention, the providing light to illuminate the dark spot includes providing a three-dimensional (3D) holographic image corresponding to the holographic image produced to appear at the blocked spot.

According to an aspect of some embodiments of the present invention there is provided a display for displaying an interference based holographic image including a first Spatial Light Modulator (SLM) for modulating coherent light to produce an interference based holographic image, a Zero Order Diffraction (ZOD) blocker arranged to block a ZOD bright spot of light emanating from the first SLM, placed at a focus of the ZOD bright spot, a second light source for filling in a dark spot in the holographic image produced by the ZOD blocker blocking some of the light emanating from the first SLM, and a beam splitter for combining light from the second light source with light emanating from the first SLM.

According to some embodiments of the invention, the second light source is arranged to provide a uniform spot of light to illuminate the dark spot.

According to some embodiments of the invention, further including the second light source including an intensity control to control intensity of illumination of the uniform spot of light.

According to some embodiments of the invention, further including the second light source including a color control to control color of illumination of the uniform spot of light.

According to some embodiments of the invention, the second light source includes a two-dimensional (2D) image display.

According to some embodiments of the invention, the two-dimensional (2D) image display is arranged for control by a computer to display a 2D image corresponding to the holographic image produced to appear at the blocked spot.

According to some embodiments of the invention, the second light source includes a three-dimensional (3D) interference based holographic image display.

According to some embodiments of the invention, the three-dimensional (3D) image display is arranged for control by a computer to display a 3D holographic image corresponding to the holographic image produced to appear at the blocked spot.

According to an aspect of some embodiments of the present invention there is provided a method for directing non-modulated light from a Spatial Light Modulator (SLM) and allowing through modulated light for producing an interference based holographic image, the method including illuminating the SLM with coherent light, thereby producing a mix of light modulated by the SLM and light not modulated by the SLM, and projecting the mix of the modulated light and the not modulated light along an optical axis onto a volume grating, wherein the volume grating directs the not modulated light away from the holographic image and allows through modulated light for producing the holographic image.

According to some embodiments of the invention, the volume grating allows through modulated light which is at an angle to the optical axis which is greater than 1 milliradian.

According to some embodiments of the invention, the volume grating includes an interference pattern having a rotational symmetry.

According to some embodiments of the invention, the volume grating includes an interference pattern of a first plane wave interfering with a second plane wave which has passed through an optical element in a shape of a conic solid. According to some embodiments of the invention, the volume grating includes an interference pattern of a first plane wave interfering with a second plane wave which has passed through an optical element in a shape of a conical lens.

According to some embodiments of the invention, the volume grating includes an interference pattern of a first plane wave interfering with a second plane wave which has passed through an optical element in a shape of a pyramidal solid. According to some embodiments of the invention, the volume grating includes an interference pattern of a first plane wave interfering with a second plane wave which has passed through an optical element in a shape of a pyramidal lens.

According to some embodiments of the invention, the volume grating pattern includes an interference pattern of a first plane wave interfering with a second plane wave which has passed through an optical element with an axis parallel to a direction of propagation of the second plane wave.

According to some embodiments of the invention, the volume grating is arranged to diffract Zero Order Diffraction light at an angle larger than a maximal diffraction angle of the SLM relative to the optical axis.

According to some embodiments of the invention, the volume grating includes an interference pattern of a first plane wave interfering with a second plane wave which has passed through an optical element in a shape of a conic solid, and a head angle $\beta$ of the optical element in a shape of a conic solid is larger than $$\beta = \pi - \frac{2*\theta_d}{n-1}$$

where n is a refractive index of the optical element.

According to some embodiments of the invention, further including passing light from the SLM through a magnifying lens array, wherein the volume grating is arranged to diffract Zero Order Diffraction light at angles larger than the SLM de-magnified maximal diffraction angle relative to the optical axis.

According to an aspect of some embodiments of the present invention there is provided apparatus for displaying an interference based holographic image and directing non-modulated light away from the holographic image, including an SLM for modulating coherent light to produce an interference based holographic image, and a volume grating for directing non-modulated coherent light away from the holographic image.

According to some embodiments of the invention, the volume grating is designed to allow through modulated light which is at an angle greater than 1 milliradian to the optical axis.

According to some embodiments of the invention, the volume grating includes an interference pattern having a rotational symmetry.

According to some embodiments of the invention, the volume grating includes an interference pattern of a first plane wave interfering with a second plane wave which has passed through an optical element in a shape of a conic solid. According to some embodiments of the invention, the volume grating includes an interference pattern of a first plane wave interfering with a second plane wave which has passed through an optical element in a shape of a conical lens.

According to some embodiments of the invention, the volume grating includes an interference pattern of a first plane wave interfering with a second plane wave which has passed through an optical element in a shape of a pyramidal solid. According to some embodiments of the invention, the volume grating includes an interference pattern of a first plane wave interfering with a second plane wave which has passed through an optical element in a shape of a pyramidal lens.

According to some embodiments of the invention, the volume grating pattern includes an interference pattern of a first plane wave interfering with a second plane wave which has passed through an optical element with an axis parallel to a direction of propagation of the second plane wave.

According to some embodiments of the invention, the volume grating is arranged to diffract Zero Order Diffraction light at an angle larger than a maximal diffraction angle of the SLM relative to the optical axis.

According to some embodiments of the invention, the volume grating includes an interference pattern of a first plane wave interfering with a second plane wave which has passed through an optical element in a shape of a conic solid, and a head angle θ of the optical element in a shape of a conic solid is larger than $$\beta = \pi - \frac{2 * \theta_d}{n - 1}$$

where n is a refractive index of the optical element.

According to some embodiments of the invention, the volume grating is arranged to diffract Zero Order Diffraction light at angles larger than the SLM de-magnified maximal diffraction angle relative to the optical axis.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, as software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 2B is a simplified line drawing illustration of the system of FIG. 2A according to an example embodiment of the invention;

Figure 1A:
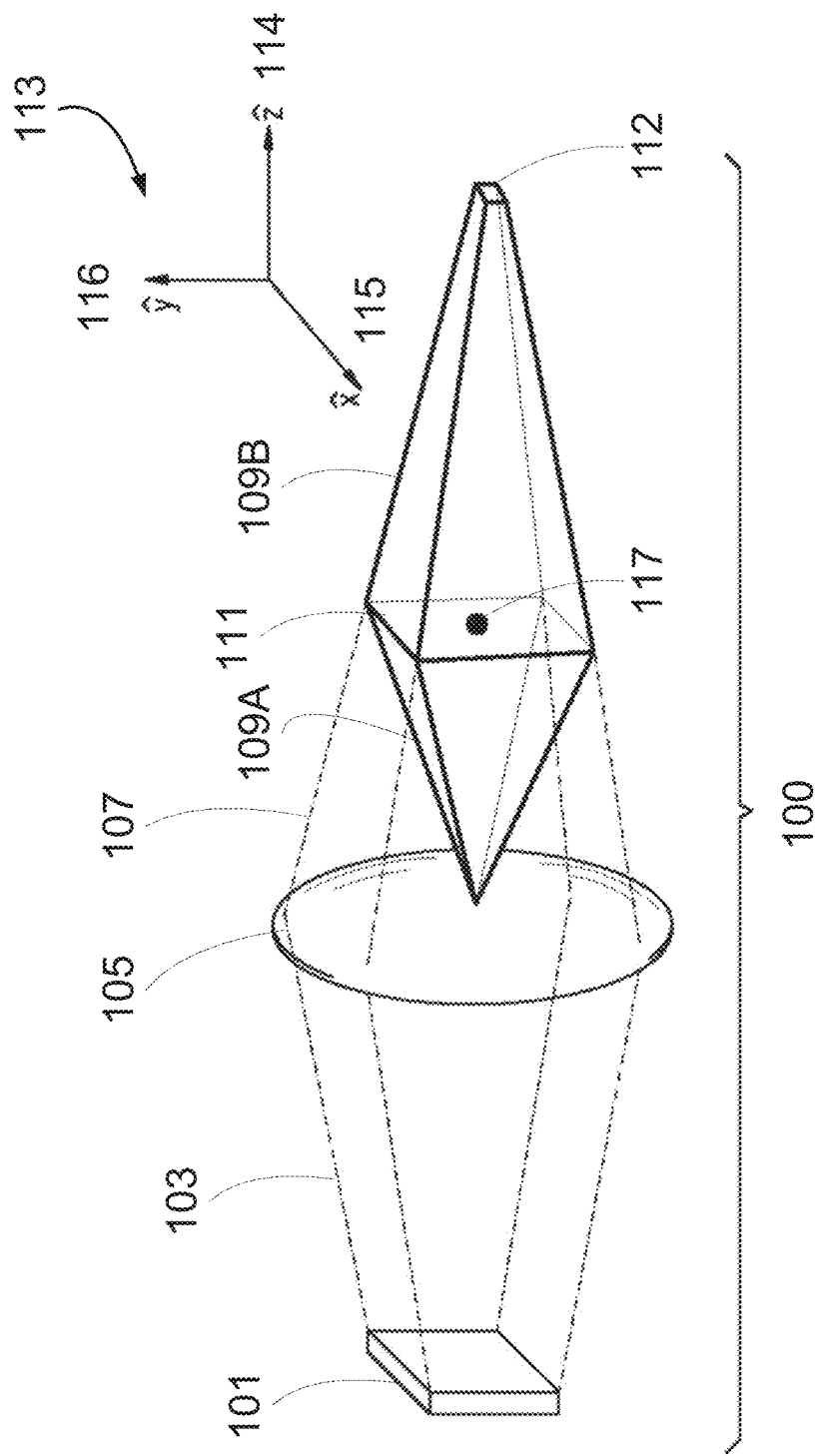
FIG. 1A is a simplified line drawing illustration of a basic optical system used to display a Fourier holographic image according to an example embodiment of the invention.

DESCRIPTION OF SPECIFIC EMBODIMENTS
OF THE INVENTION

The present invention, in some embodiments thereof, relates to methods and devices for reducing an effect of a zero order diffraction bright spot on quality of a displayed image.

Some images, such as, by way of a non-limiting example, Fourier holographic images, have a zero-order diffraction [ZOD] bright spot at the center of image space, at the focal plane. The bright spot at the center of the image significantly reduces the image quality perceived by a viewer.

Wherever a viewer or a viewer's eye are referred to throughout the present specification and claims, other viewing entities are also to be understood, such as sensors and imaging systems such as cameras and other optical systems.

An aspect of some embodiments of the invention includes using an optical design in which a holographic image which includes an optical by-product termed a Zero-Order-Diffraction bright spot is improved by reducing a negative effect of the bright spot on the holographic image.

In some embodiments, the bright spot is shifted away from a location of the holographic image, along an optical axis of the holographic image display system or sideways relative to the optical axis. In some embodiments, light for forming the bright spot is directed away from the optical axis of the holographic image display system.

In some embodiments, light for forming the holographic image is apodized, which has an effect of reducing the intensity of the bright spot, and enlarging an area of the reduced-intensity bright spot.

In some embodiments, the bright spot is fully or partially blocked, producing a dark spot. In some embodiments, the dark spot is filled in with light to be less noticeable and to better blend in with the holographic image. In some embodiments, the dark spot is filled in with an image which corresponds to a portion of the holographic image which is included in the dark spot, thereby partially or fully reconstructing the holographic image, without displaying the bright spot.

In some embodiments, various combinations of two or more of the above techniques are used to improve the holographic image and/or reduce a negative effect of the bright spot on the holographic image.

An aspect of some embodiments of the invention includes using an optical design in which a holographic image is displayed shifted from the ZOD bright spot in a direction along an optical axis, so the image is closer to the viewer than the ZOD bright spot, or further from the viewer than the ZOD bright spot.

The terms "Spatial Light Modulator" and "SLM" are used in the present specification and claims to mean various types of SLMs, including reflection, transmission, phase-only, amplitude-only and combination phase and amplitude SLMs, as can be understood by a person skilled in the art.

The term "image location" is used in the present specification and claims to mean a location along an optical axis where a real CGH image is in focus, typically a plane or a volume where the CGH image is in focus, as is understood by a person skilled in the art.

The terms "holographic image" and "CGH image" are used in the present specification and claims to mean a Fourier holographic image and a Fourier CGH image respectively.

The terms "ZOD" and "ZOD bright spot" are used in the present specification and claims to mean Zero Order Diffraction, as can be understood by a person skilled in the art.

In some embodiments the ZOD bright spot is optionally blocked, without blocking a significant part or even any part of the holographic image, since the ZOD bright spot is not occupying a same location as the holographic image.

In some embodiments the ZOD bright spot may be blocked, producing a dark spot in place of the bright spot, yet a location of the ZOD bright spot now turned into a dark spot is optionally re-imaged along the optical axis to infinity along the optical axis, or to a long distance in direction of infinity, so the dark spot caused by the blocking is not imaged anywhere near the holographic image.

In some embodiments the ZOD bright spot may be blocked, and the location of the ZOD bright spot is optionally re-imaged along the optical axis to minus infinity along the optical axis, or to a long distance in direction of minus infinity, re-imaging the dark spot caused by the blocking so as not to be anywhere near the holographic image.

In some embodiments the ZOD bright spot may be blocked, and the location of the ZOD bright spot is optionally re-imaged along the optical axis close to an observer's eye, by way of a non-limiting example closer than 70 millimeters from the observer's eye. A human observer typically does not focus at a distance of less than 70 millimeters, so the dark spot will typically not be seen clearly, and its adverse effect on the holographic image will be significantly reduced.

An aspect of some embodiments of the invention includes using an optical design in which a wedge or a prism is optionally placed in front of a Spatial Light Monitor (SLM) used to produce a holographic image.

In some embodiments the SLM produces a holographic image along a first direction, and reflections from the SLM, which serve to produce at least part of the ZOD bright spot, are projected in a second direction.

In some embodiments, the light which produces the ZOD bright spot is optionally blocked, and the block does not interfere with the holographic image since it is off the axis of the light for producing the holographic image.

In some embodiments, further along an optical axis of an optical system for producing the holographic image, the light which produces the ZOD bright spot is optionally reflected or refracted even further away from a direction of the light for producing the holographic image.

In some embodiments, the light which produces the ZOD bright spot is optionally absorbed by an absorbing element, such as a light absorbing material, flock paper, light absorbing foil and the like.

In some embodiments a blazed grating is optionally used instead of or in addition to a wedge in front of the SLM.

In some embodiments a multi-layers wedge structure is optionally used in front of the SLM.

In some embodiments the SLM is tilted with respect to coherent illuminating light for producing the holographic image, and a CGH image is produced by the SLM, so that reflections of a face of the SLM are optionally directed away from an optical axis used for imaging the holographic image.

An aspect of some embodiments of the invention includes using an apodization filter in front of a SLM used to produce a holographic image.

In some embodiments the apodization filter narrows a width of the ZOD bright spot, potentially enabling (a) the ZOD bright spot to interfere with a smaller area of the holographic image or (b) a block of the ZOD bright spot to interfere with a smaller area of the holographic image.

In some embodiments the apodization filter reduces intensity of light in side-lobes of the zero-order spot, and a ZOD bright spot blocker can be smaller than without the apodization filter.

In some embodiments an average amplitude at an edge of the SLM is optionally reduced by as much as 10, 25, 50, 75, 90%, or other values in the range, optionally in a smooth gradient profile. In some embodiments the gradient profile is optionally extended from a boundary of the 5% intensity to a distance of 2 to 500 wavelengths.

In some embodiments an edge of the SLM is considered as a location where the apodization amplitude reduces to 0%-5% of the not-reduced light intensity.

In some embodiments only a part of the SLM is illuminated and the apodization amplitude reduces to 0%-5% of the not-reduced light intensity at a location inside from an edge of the SLM.

An aspect of some embodiments of the invention includes blocking a ZOD bright spot, thereby producing a dark spot somewhere in a viewed image, and filling in the dark spot.

In some embodiments, the filling in is with a uniform field of light.

In some embodiments, the filling in is with a uniform field of light with a brightness equal to an average brightness of the holographic image in the area of the blocked spot.

In some embodiments, the filling in is with a two-dimensional (2D) image of the area of the blocked spot of the holographic image.

In some embodiments, the filling in is with a second three-dimensional holographic image of the area of the blocked spot of the first holographic image.

An aspect of some embodiments of the invention includes using an Distributed Bragg Reflector (DBR) in front of a SLM used to produce a holographic image, to block on-axis not-modulated light coming from the SLM, which produces the ZOD bright spot, while not blocking, or blocking much less, off-axis light which produces the holographic image.

In some embodiments the DBR is placed in front of the SLM and before any other optical focusing element.

An aspect of some embodiments of the invention includes a method for diverging non-modulated light from a Spatial Light Modulator (SLM) away from an image produced by the SLM.

An aspect of some embodiments of the invention includes using a volume grating to diverge light which may produce a ZOD bright spot away from a holographic image.

In some embodiments the volume grating is designed to diverge light away from the holographic image by an angle which is larger than a maximal diffraction angle of the SLM relative to the optical axis.

In some embodiments, the light which is diverged away from the holographic image is on-axis light, in a direction parallel to the optic axis, typical reflected from or transmitted through an SLM used to produce the holographic image.

In some embodiments, the light which is diverged away from the holographic image is light reflected from or transmitted through an SLM without having been modulated to produce the holographic image.

In some embodiments the volume grating is optionally placed along an optic axis after the SLM and before any other optical focusing element.

According to some embodiments of the invention, the volume grating is a volume distribution of modulated index of refraction.

According to some embodiments of the invention, an index of refraction pattern in the volume grating is a volume interference pattern of a plane-wave passing through an optical element such as a conical lens interfering with a reference plane-wave.

In some embodiments a head angle of the conical lens and/or conic solid is selected so that the volume grating diverges light away from the holographic image by an angle which is larger than a maximal diffraction angle of the SLM relative to the optical axis.

Before explaining at least one embodiment of the invention in detail, it is to be understood that the invention is not necessarily limited in its application to the details of construction and/or the arrangement of the components and/or methods set forth in the following description and/or illustrated in the drawings and/or the Examples. The invention is capable of other embodiments or of being practiced or carried out in various ways.

Reference is now made to FIG. 1A, which is a simplified line drawing illustration of a basic optical system used to display a Fourier holographic image according to an example embodiment of the invention.

FIG. 1A shows an example embodiment of a system 100 for displaying a Fourier holographic image. The system 100 includes a Spatial Light Modulator (SLM) 101 and an optic element such as a lens 105. Coherent light 103 travels from the SLM 101 toward the lens 105. The lens 105 focuses light 107 onto a plane 111. The plane 111 is termed a Fourier plane.

FIG. 1A also includes a drawing of a three-dimensional axis system—a ẑ axis 114 in a direction of an optical axis of the system 100, and an x̂ axis 115 and a ŷ axis 116 perpendicular to each other and to the ẑ axis 114.

The ẑ axis 114, the x̂ axis 115 and the ŷ axis 116 may be referred to elsewhere in the present specification as a z axis, an x axis and a y axis with or without reference numbers, with or without displaying the axes in a drawing. In all cases the z axis will refer to a direction of an optical axis of a system for displaying the holographic image, as will be understood by a person ordinarily skilled in the art, and the x axis and the y axis will refer to axes perpendicular to the z axis and to each other.

FIG. 1A also shows a shape of a volume in space, including two base to base pyramids 109A 109B. Pyramid 109B is actually what is called a truncated pyramid. The bases of the two pyramids 109A 109B meet at a plane 111, also termed the Fourier plane. It is noted that the two pyramids 109A 109B may optionally represent other tapering shapes such as cones, as will be understood by a person skilled in the art.

A three dimensional holographic image (not shown in FIG. 1A) may be imaged within the volume of the two pyramids 109A 109B.

A ZOD bright spot 117 is formed in the plane 111.

In some embodiments, an image of the SLM 101, that is, a location where an image of the SLM 101 is in focus, defines an exit pupil 112 of the system 100, or an observing window 112 of the holographic image. An observer's eye (not shown) may be placed at or near the observing window 112 to see the holographic image.

Optionally, the location of the SLM image is somewhere along an optical path between the observer's eye and the holographic image.

A size and shape of a volume in which a holographic image may be displayed, corresponding to the two pyramids 109A 109B can vary, and is typically shaped by the diffraction, or optical power, of the SLM and of additional optical elements such as lenses in the system 100.

In various embodiments, the volume can have various shapes depending on the specific size and location of the lenses, the wavelength of light and the pixel size of the SLM.

Figure 1B:
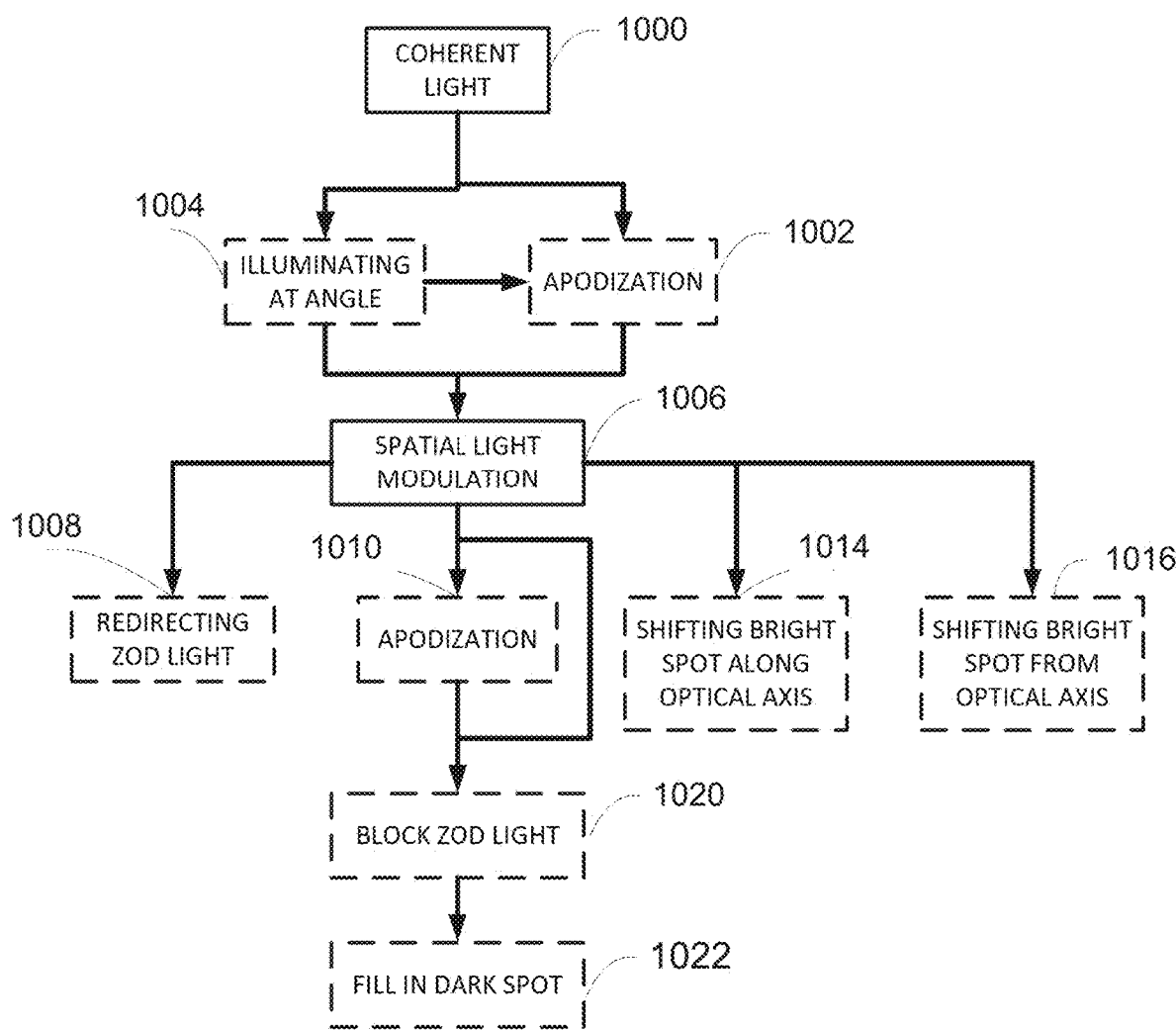
FIG. 1B is a simplified flow chart illustration of a method of improving a holographic image by reducing an effect of a Zero Order Diffraction (ZOD) spot on the holographic image according to an example embodiment of the invention.

Reference is now made to FIG. 1B, which is a simplified flow chart illustration of a method of improving a holographic image by reducing an effect of a Zero Order Diffraction (ZOD) spot on the holographic image according to an example embodiment of the invention.

The method illustrated by FIG. 1B starts with producing coherent light 1000, for illuminating an SLM to modulate light for producing the holographic image.

Various additional actions effecting the illuminating are described below. Any one or more of the actions can potentially have a beneficial effect on appearance of the holographic image, reducing an effect of the ZOD bright spot, and/or eliminating the ZOD bright spot, and/or blocking the ZOD bright spot and/or filling-in a dark spot formed by the blocking to improve the appearance of the holographic image.

In some embodiments 1002, the illumination of the SLM is optionally performed through an apodization filter, which has an effect of widening a ZOD bright spot main lobe and reducing side lobes, potentially reducing an adverse effect the bright spot has on the holographic image.

In some embodiments, the coherent light illumination of the SLM is optionally performed at an angle to a normal of a face of the SLM, and additionally through an apodization filter. In some embodiments the illumination of the SLM is optionally performed at an angle to a normal of a face of the SLM through a prism or a wedge shaped optical component, or a grating.

Light reaching the SLM is spatially modulated 1006, producing spatially modulated light for producing the holographic image.

In some embodiments 1008, light leaving the SLM is optionally redirected so that light reflected off a face of the SLM, which potentially produces the ZOD bright spot, is redirected in a different direction than the light for producing the holographic image. By way of example, the illuminating light may have illuminated the SLM at an angle to a normal of a face of a front surface of an optical component, such as a wedge or prism, thus also being reflected at an angle from the surface of the wedge, while light for forming the holographic image may be directed in a different direction.

In some embodiments 1010, light leaving the SLM optionally passes through an apodization filter, which has an effect of widening a ZOD bright spot main lobe while reducing side lobes, potentially reducing an adverse effect the bright spot has on the holographic image.

In some embodiments 1014, light leaving the SLM optionally passes through optical components, which produce the holographic image at a first distance along the optical axis, and the ZOD bright spot at a second, different distance along the optical axis. In some embodiments the first distance and the second distance are determined by designing the optical components, optionally setting the second distance so that a viewer focusing on the holographic image at the first distance does not simultaneously focus on the ZOD bright spot.

In some embodiments 1016, light leaving the SLM optionally passes through optical components, which produce the ZOD bright spot shifted sideways relative to a location of the holographic image.

In some embodiments 1016, light leaving the SLM optionally passes through optical components, which image the holographic image at a location shifted sideways relative to a location of the ZOD bright spot.

In some embodiments 1020, light leaving the SLM and/or light passing through the apodization filter pass through a ZOD blocking component which fully or partially blocks light from an area which includes the ZOD bright spot, producing a holographic image which includes a dark spot area.

In some embodiments 1022, light passing the ZOD blocking component is combined with additional fill-in light at the dark spot area. In some embodiments the fill-in light is adjusted in intensity to reduce contrast between the fill-in area and surrounding area in the holographic image. In some embodiments the fill-in light is an image of a portion of the holographic image which is within the dark spot area.

Figure 1C:
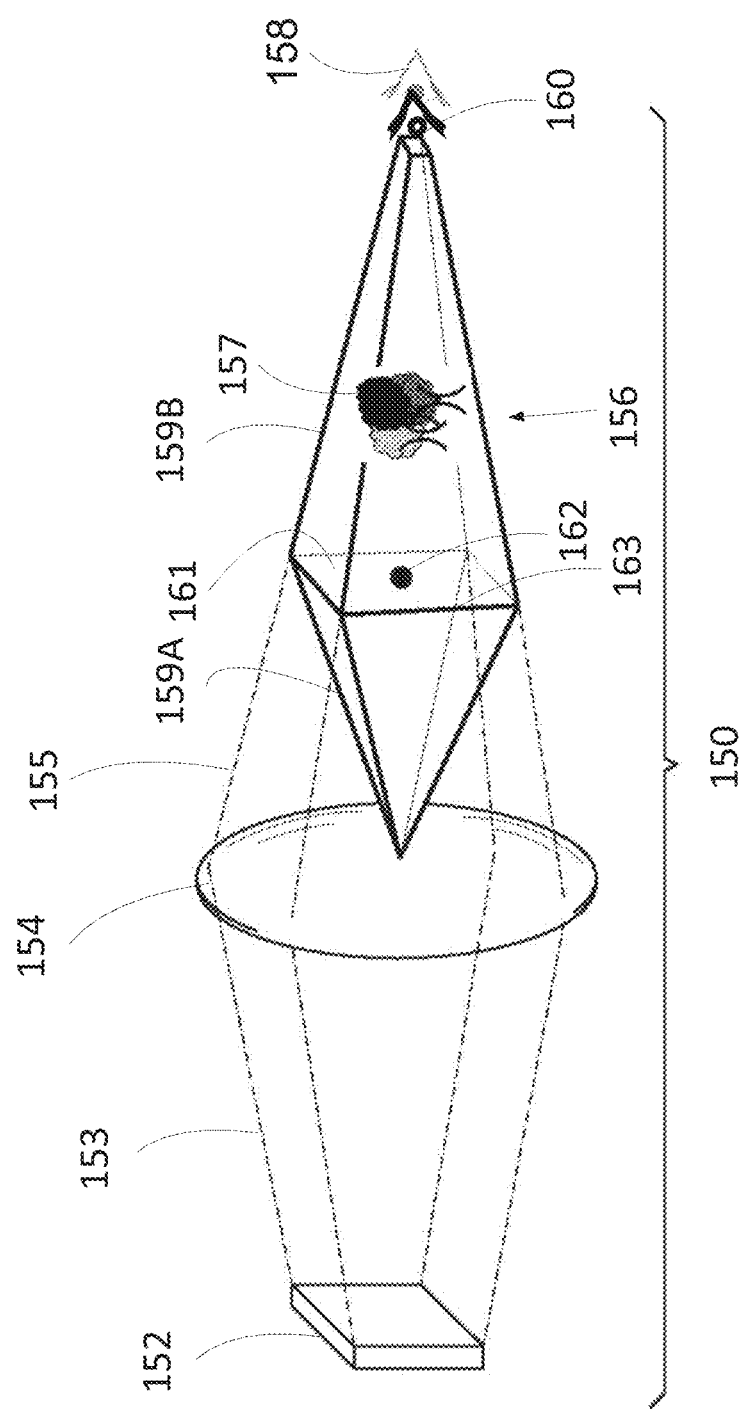
FIG. 1C is a simplified line drawing illustration of a basic optical system used to display a holographic image according to an example embodiment of the invention.

Reference is now made to FIG. 1C, which is a simplified line drawing illustration of a basic optical system used to display a holographic image according to an example embodiment of the invention.

FIG. 1C shows an example embodiment of a system 150 for displaying a Fourier holographic image. The system 150 includes a Spatial Light Modulator (SLM) 152 and one or more optic element(s) such as a lens 154.

Modulated coherent light 153 travels from the SLM 152 toward the lens 154. The lens 154 focuses light 155 producing a holographic image 157 at a holographic image location 156.

A viewer's eye 158 is shown viewing the holographic image 157, at an observing window 160 at the holographic image location 156.

FIG. 1C also shows a shape of a volume in space, including two base to base pyramids 159A 159B. Pyramid 159B is actually what is called a truncated pyramid. The bases of the two pyramids 159A 159B meet at a plane 161, also termed the Fourier plane. It is noted that the two pyramids 159A 159B may optionally represent other tapering shapes such as cones, as will be understood by a person skilled in the art.

FIG. 1C shows a location to which the optic element(s) optionally focus a ZOD bright spot 162 relative to the location 157 of the holographic image and relative to the viewer's eye 158.

The ZOD bright spot 162 is produced, at least partially, by light reflected from a face of the SLM 152, starting out as an approximately plane wave, focused at the Fourier plane 161, behind the location 156 of the holographic image 157 relative to the viewer's eye 158.

FIG. 1C shows the ZOD bright spot 162 at a location different from the location 157 of the holographic image. In some embodiments, a ZOD blocker 163 is placed at a location of the ZOD bright spot 162.

The ZOD blocker 163 may be a filter which blocks light, and/or reduces light, at a specific area, and lets through light in other areas.

In some embodiments the ZOD blocker is an optical filter without possibility of light intensity-reduction adjustment.

In some embodiments the ZOD blocker 163 is optionally a Liquid Crystal (LC) filter, optionally controlled to let through light in some areas and block or reduce intensity of light in other areas. In some embodiments an amount of light reduction at the area of ZOD bright spot blocking is optionally adjustable, optionally by computer control.

Figure 1D:
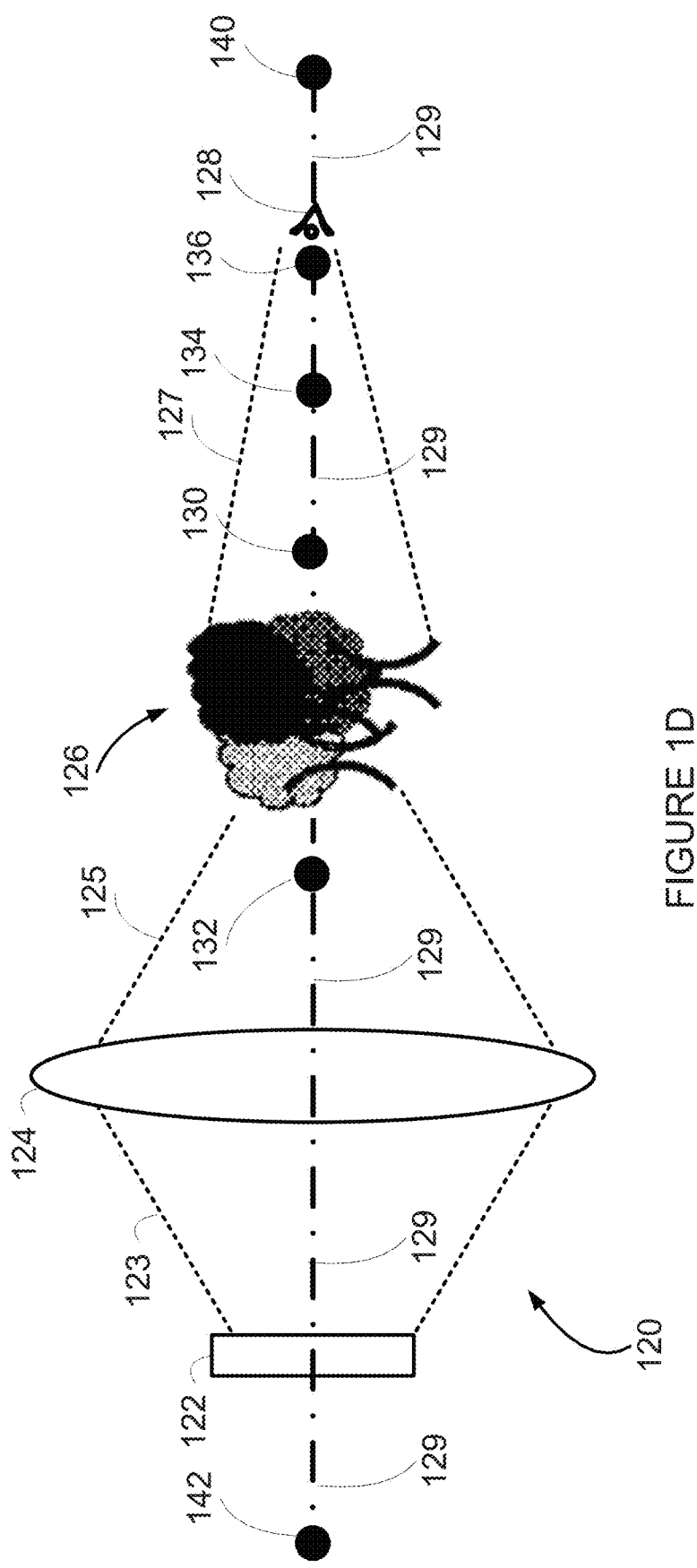
FIG. 1D is a simplified line drawing illustration of a basic optical system used to display a holographic image according to an example embodiment of the invention.

Reference is now made to FIG. 1D, which is a simplified line drawing illustration of a basic optical system used to display a holographic image according to an example embodiment of the invention.

FIG. 1D shows an example embodiment of a system 120 for displaying a Fourier holographic image. The system 120 includes a Spatial Light Modulator (SLM) 122 and one or more optical element(s) such as a lens 124.

Modulated coherent light 123 travels from the SLM 122 toward the lens 124. The lens 124 focuses light 125 producing a holographic image at a holographic image location 126.

A viewer's eye 128 is shown viewing the holographic image at the holographic image location 126.

FIG. 1D also includes a drawing of an optical axis 129 from the SLM 122 to a viewer's eye 128 and continuing beyond the viewer's eye 128.

FIG. 1D shows various locations to which the optical element(s) optionally focus a ZOD bright spot at various locations 130 132 134 136 140 142 along the optical axis 129 relative to the location 126 of the holographic image and relative to the viewer's eye 128.

The ZOD bright spot is produced, at least partially, by light reflected from a face of the SLM 122, starting out as an approximately plane wave, focused at approximately optic minus infinity, while the holographic image is produced by modulated light which is not focused at optic minus infinity. The one or more optic element(s) can focus the plane wave of the ZOD bright spot, which starts at a different optic distance from the one or more optic element(s) than the image produced by the SLM, at a different distance than the location 126 of the holographic image.

Example embodiments of locations of the ZOD bright spot include:

a ZOD bright spot at a first location 140 at optical infinity, or a great distance, effectively optical infinity, along the optical axis 129, behind the viewer's eye 128;

a ZOD bright spot at a second location 142 at optical minus infinity, or a great distance, effectively optical minus infinity, along the optical axis 129;

a ZOD bright spot at a third location 134 at a distance of less than 200 millimeters from the viewer's eye 128;

a ZOD bright spot at a fourth location 136 approximately at the viewer's eye 128;

a ZOD bright spot at a fifth location 130 at a distance along the optical axis which is closer to the viewer's eye than the location 126 of the holographic image; and a ZOD bright spot at a sixth location 132 at a distance along the optical axis which is further from the viewer's eye than the location 126 of the holographic image.

In some embodiments the ZOD bright spot at the third location 134 is optionally at a distance of less than 70, 100, 150, or 200 millimeters from the viewer's eye 128.

Figure 1E:
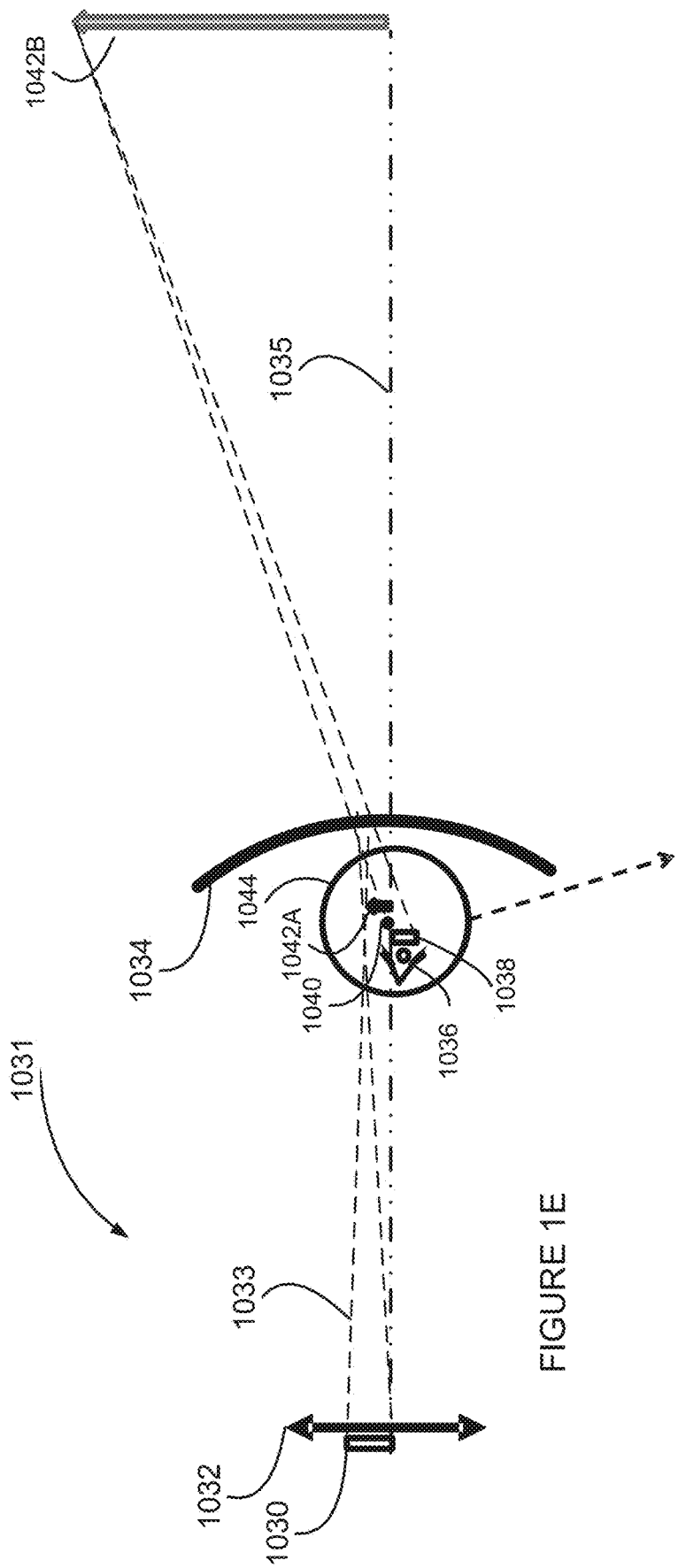
FIGS. 1E and 1F are simplified line drawing illustrations of an optical system 1031 used to display a Fourier holographic image according to an example embodiment of the invention.
Figure 1F:
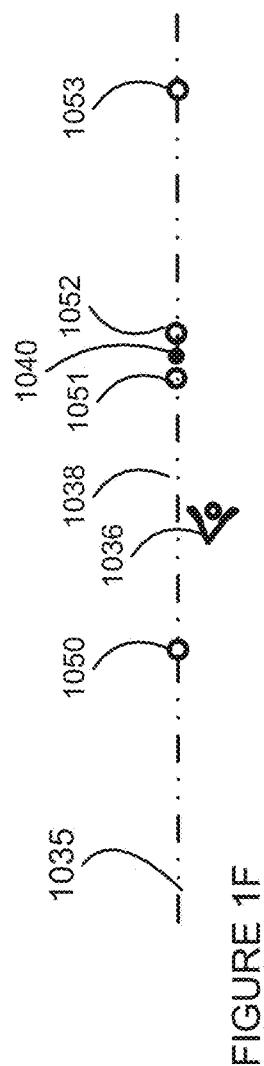

Reference is now made to FIGS. 1E and 1F, which are simplified line drawing illustrations of an optical system 1031 used to display a Fourier holographic image according to an example embodiment of the invention.

FIG. 1E shows a specific optical design which can be used to adjust a location of a ZOD bright spot relative to a location of a holographic image both produced by the same optical system 1031.

FIG. 1F shows an enlarged view of a portion 1044 of FIG. 1E, specifically pointing out some example locations of a re-imaged ZOD bright spot relative to a viewer's eye 1036 and to an original location of the bright spot 1040.

FIGS. 1E and 1F show an example embodiment of the system 1031 for displaying a Fourier holographic image 1042A 1042B. The system 1031 includes a Spatial Light Modulator (SLM) 1030 and one or more optic elements such as a lens 1032. Modulated coherent light 1033 travels from the SLM 1030 toward the lens 1032. The lens 1032 focuses light 1033, forming a holographic image 1042A and a bright spot 1040.

In some embodiments one or more additional optic elements such as a curved mirror, or a semi-transparent mirror 1034 reimages the holographic image 1042A to a second location 1042B, optionally also reimages the bright spot 1040 to another location along an optical axis 1035, and optionally also image the SLM 1030 and lens 102 near to the observer eye, at a location 1038.

In some embodiments the SLM image location 1038 is designed to be close to a viewer's eye 1036, e.g. within +/−20 millimeters ahead or behind of the viewer's eye 1036.

In some embodiments the SLM image location 1038 is designed to be close to a viewer's eye 1036, e.g. within +/−10 millimeters, 14 millimeters, 16 millimeters, 18 millimeters, 20 millimeters, 22 millimeters ahead or behind of the viewer's eye 1036.

In the example embodiment of FIG. 1E, the second location 1042B shows the viewer's eye 1036 an enlarged view of the holographic image.

FIG. 1F shows various optional locations to which the optical design can reimage the ZOD bright spot 1040.

Persons skilled in the art will appreciate that an optical system which includes a plurality of design parameters, such as a power of the optic elements such as a lens 1032 and a power of the additional optic elements such as the semi-transparent mirror 1034, enables an optical designed to shift a location of the holographic image 1042A forward or backward of the ZOD bright spot along the optical axis 1035.

FIG. 1F shows some example locations 1050 1051 1052 1053 for a reimaged bright spot 1040 along the optical axis:

a first example location 1050, potentially at focus at a location behind the viewer's eye 1036;

a second example location 1051, forward of the viewer's eye 1036, behind the location of the first image of the bright spot 1040;

a third example location 1052, forward of the viewer's eye 1036, also forward of the location of the first image of the bright spot 1040; and a fourth example location 1054, forward of the viewer's eye 1036, also forward of the location of the first image of the bright spot 1040, even forward of the original holographic image 1042A.

Figure 1G:
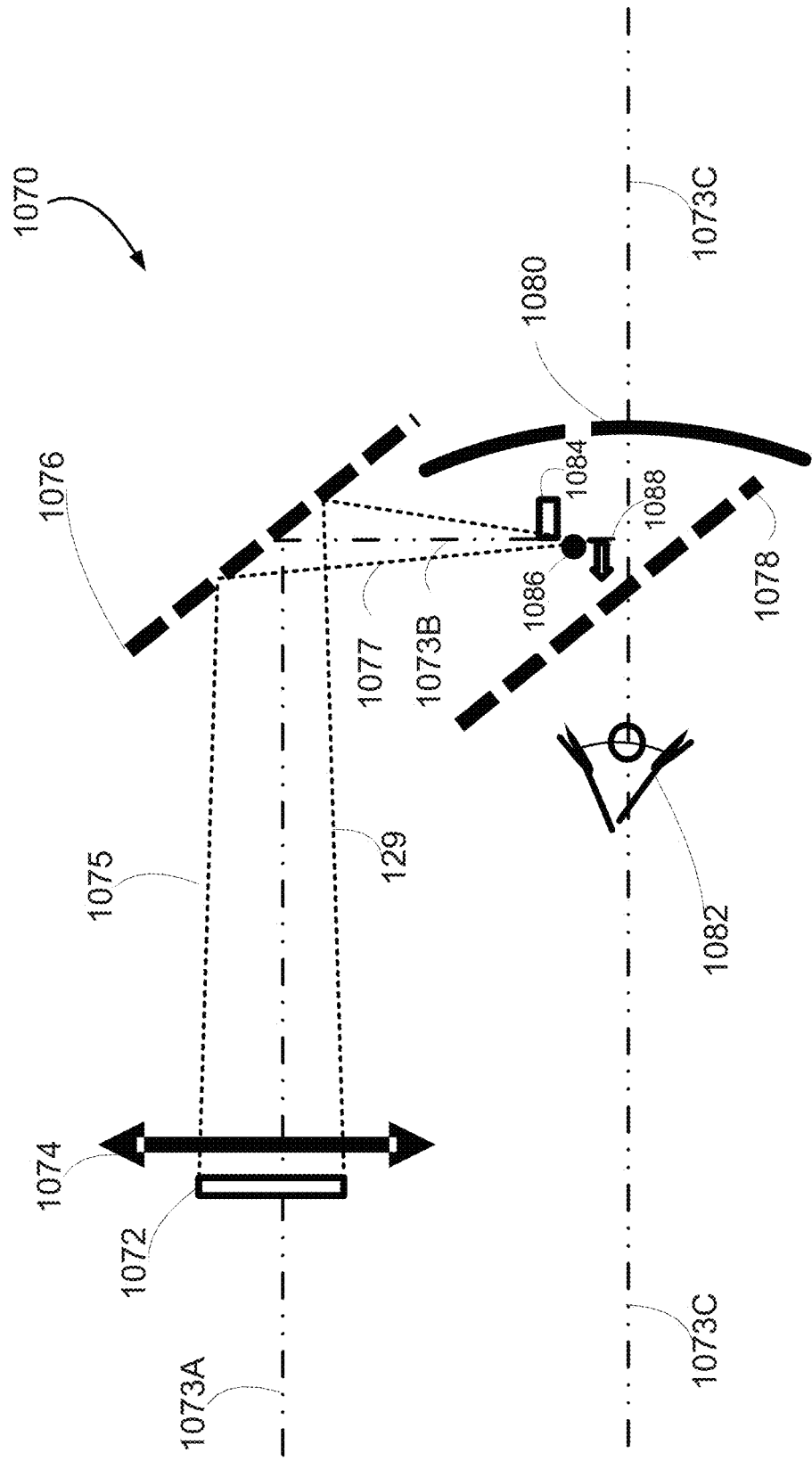
FIG. 1G is a simplified line drawing illustration of an optical system used to display a Fourier holographic image in a Head Mounted Display (HMD) according to an example embodiment of the invention.

Reference is now made to FIG. 1G, which is a simplified line drawing illustration of an optical system used to display a Fourier holographic image in a Head Mounted Display (HMD) according to an example embodiment of the invention.

FIG. 1G shows an optical system 1070 which can be recognized by a person skilled in the art who has studied the system 1031 of FIG. 1E, changed to redirect light in a manner suitable for use in a HMD.

FIG. 1G shows an example embodiment of the system 1070 for displaying a Fourier holographic image 1088. The system 1070 includes a SLM 1072 and one or more optic elements such as a lens 1074. Modulated coherent light 1075 travels from the SLM 1072 toward the lens 1074 along an optical axis 1073A. The lens 1074 focuses light 1075, for forming a holographic image 1088 and a bright spot 1086. A direction of propagation of the light 1075 is optionally changed by a mirror 1076, and the light 1075 continues as light 1077, along an optical axis 1073B, and forms the holographic image 1088 and the bright spot 1086.

In some embodiments one or more additional optic elements such as a curved mirror, or a semi-transparent mirror 1080 reimage the holographic image 1088 to a second location (not shown), optionally also reimage the bright spot 1086 to another location (not shown) along an optical axis 1073C, optionally also reimage the SLM 1072 and lens 1074 to the observer's eye 1082 forming SLM image 1084.

In some embodiments the SLM image 1084 is optionally re-imaged to a location (not shown) close to a viewer's eye 1082, e.g. within +/−20 millimeters ahead or behind of the viewer's eye 1082.

Figure 1H:
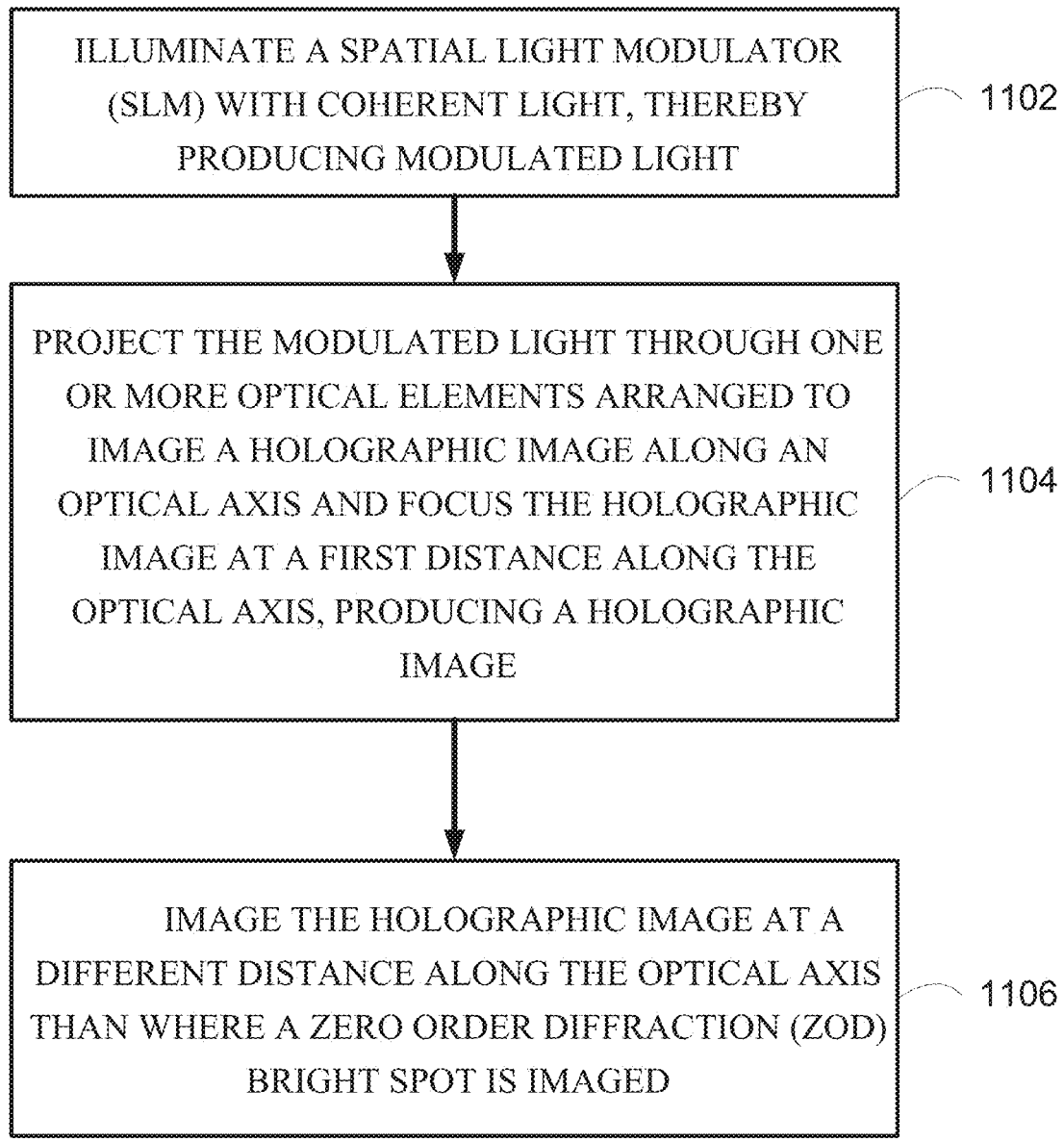
FIG. 1H is a simplified flow chart illustration of a method for displaying holographic images according to an example embodiment of the invention.

Reference is now made to FIG. 1H, which is a simplified flow chart illustration of a method for displaying holographic images according to an example embodiment of the invention.

The method of FIG. 1H includes:

illuminating a computer controlled Spatial Light Modulator (SLM) with coherent light, thereby producing modulated light (1102); and projecting the modulated light through one or more optical elements arranged to image a holographic image along an optical axis and focus the holographic image at a first distance along the optical axis, producing a holographic image (1104); and wherein the producing the holographic image further comprises imaging the holographic image at a different distance along the optical axis than where a Zero Order Diffraction (ZOD) bright spot is imaged (1106).

Figure 1I:
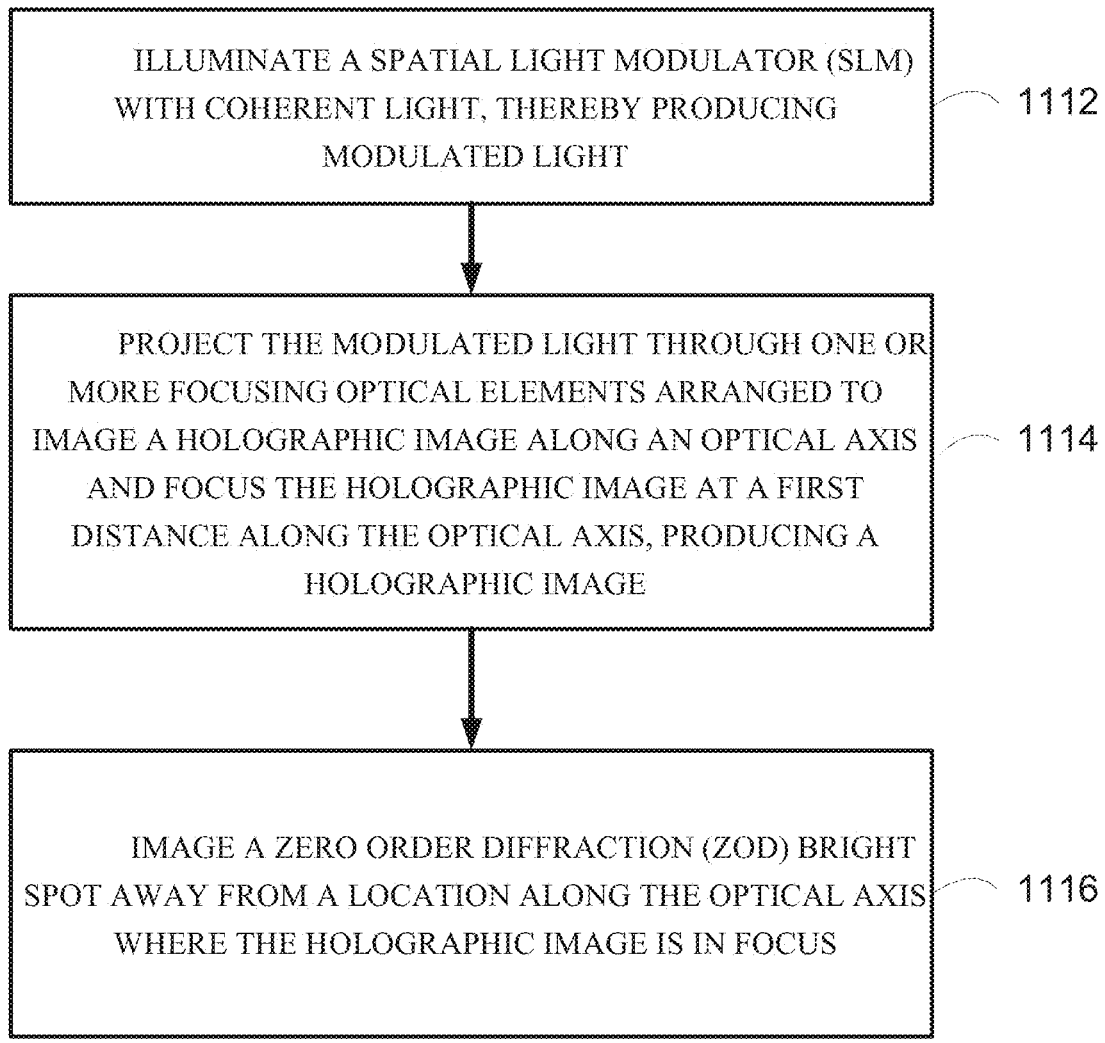
FIG. 1I is a simplified flow chart illustration of a method for displaying a holographic image according to an example embodiment of the invention.

Reference is now made to FIG. 1I, which is a simplified flow chart illustration of a method for displaying a holographic image according to an example embodiment of the invention.

The method of FIG. 1I includes:

illuminating a Spatial Light Modulator (SLM) with coherent light, thereby producing modulated light (1112); and projecting the modulated light through one or more focusing optical elements arranged to image a holographic image along an optical axis and focus the holographic image at a first distance along the optical axis, producing a holographic image (1114); and the one or more focusing optical elements are arranged to image a Zero Order Diffraction (ZOD) bright spot away from a location along the optical axis where the holographic image is in focus (1116).

Directing the ZOD Bright Spot Away from a Computer Generated Holographic (CGH) Image For a two-dimension (2D) Fourier image (a planar images at the focal plane 111), one example embodiment of a method to eliminate the ZOD bright spot is to block the ZOD bright spot with a high absorption spot/reflective spot/dark spot at the focal plane 111, which blocks only the ZOD bright spot at a center of the plane 111 while leaving the rest of the image unharmed. Although this method works well under perfect imaging (such as a diffraction limited optical system), for imperfect imaging system the dark stop at the center of the image may reduce the image quality, as the observer will see a dark spot in the middle of the 2D image.

In some embodiments, the blocking of the holographic image by the ZOD bright spot or the dark spot which blocks the ZOD bright spot is optionally overcome by having the holographic image at the side of ZOD bright spot, by using only a portion of the possible area for the holographic image.

The above-described solution reduces the available area for displaying the holographic image. The reduction can also be expressed as a reduction of a space-bandwidth product of the holographic image.

For a three-dimension (3D) image (volumetric image), a dark stop may shade various parts of the 3D image at different depths, thus reducing image quality. 3D Fourier holograms can be produced using SLMs, which can be transmissive or reflective and amplitude modulation or phase modulation. A reflective SLM typically has a higher fill factor (the effective aperture that each pixel uses to modulate the light). The reflective SLM has a high parasite reflection from inert surfaces reflecting unmodulated light into the ZOD bright spot Further to the above remarks there are few inherent constrains over the image space shape. Due to the large pixel size of SLM with respect to the wavelength of light illuminating the SLM, its optical power is weak, resulting in a small diffraction angle. The weak optic power makes the image space 109A 109B length along the optical axis (z axis), larger than along the transverse, x axis and y axis. The weak optical power also limits a size of a viewing window along the transverse x and y directions.

In contrast to the above described long and narrow holographic image space, many times a useful space for 3D images is box-like, optionally having somewhat similar sizes in three dimensions (similar means a same order of magnitude).

In some embodiments blocking the ZOD bright spot is done by using only a portion of the image space 109A 109B in front or beyond a ZOD blocker in the z direction, relative to the observer's eye.

In some embodiments the ZOD bright spot is imaged by the optical components of the system 100 to infinity, or substantially close to infinity in optical terms, along the optical axis, or to a large distance behind an observer's eye relative to a distance from an observer's eye to the apparent location of the holographic image. In such embodiments the ZOD bright spot is not focused by the observer's eye, which typically focuses on the holographic image, and so does not detract from the quality of the observer's view of the holographic image.

In some embodiments the ZOD bright spot is imaged by the optical components of the system 100 to minus infinity, or substantially close to minus infinity in optical terms, along the optical axis, or to a large distance behind a holographic image when viewed by an observer's eye. The large distance being large relative to a distance from the observer's eye to the apparent location of the holographic image. In such embodiments the ZOD bright spot is not focused by the observer's eye, which typically focuses on the holographic image, and so does not detract from the quality of the observer's view of the holographic image.

In some embodiments the ZOD bright spot is imaged by the optical components of the system 100 to a distance which is equal to or closer than 30, 70, 100 or 200 millimeters (mm) from a location of the observer's eye according to design. An observer's eye typically does not focus to a distance of less than 70-200 mm, so in such embodiments the ZOD bright spot is not focused by the observer's eye, which typically focuses on the holographic image, and so does not detract from the quality of the observer's view of the holographic image.

Such embodiments potentially have one or more of the following advantages:

i. A cost in space-bandwidth product is acceptably low, producing a holographic image with an acceptably high resolution and size. In other words a similar sized image is only slightly reduced with respect to an image at a center of the pyramids, due to the narrowing volume, and the size of the observing window is unchanged.

ii. The ZOD bright spot or the dark spot which blocks it are less visible to the observer relative to a case where the spots are at a center of the image. The focus of the observer's eye is at the holographic image, away from the dark spot.

Directing Light of the ZOD Bright Spot in a Direction Different than the Light for Producing the CGH Image A large portion of the ZOD bright spot intensity is due to a reflection of light from a front of an SLM or flat surface along an optic path of a display system.

In some embodiments anti-reflective coating is used on the above-mentioned surface, and the reflected light from the surface may be reduced to less than 1%. Yet, because the size of the ZOD bright spot is small; potentially almost down to a size of one CGH image pixel, and because the area producing the ZOD bright spot light may be equivalent to an order of $10^6$ pixels or more, the intensity at the ZOD bright spot due to the 1% reflection can potentially be several orders of magnitude higher than an intensity of an average pixel. For the observer's eye, this can potentially dazzle the eye and reduce the image quality.

In some embodiments, a wedge or a prism is placed in front of the SLM.

In some embodiments, a refractive index of the wedge or prism is optionally matched to a refractive index of a front cover or layer of the SLM, for potentially reducing reflections at an interface between the front cover or layer of the SLM and the prism.

In some embodiments index matching fluid between the prism and the SLM is optionally placed so as to potentially further reduce reflections.

Figure 2A:
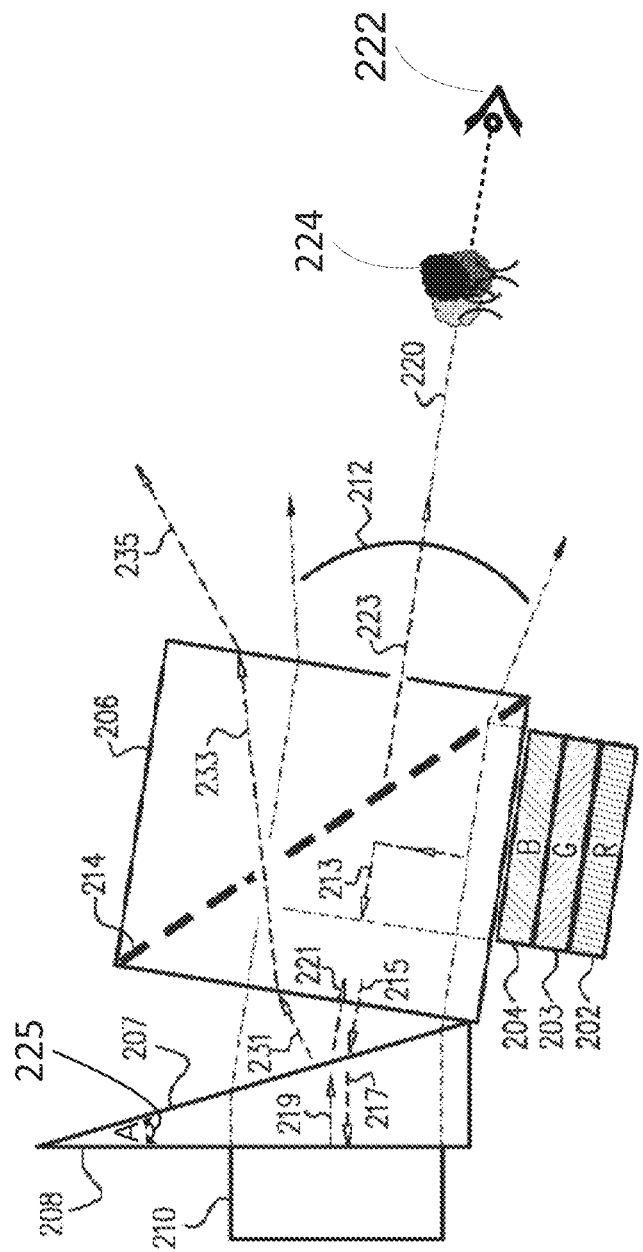
FIG. 2A is a simplified line drawing illustration of a system for producing a CGH image according to an example embodiment of the invention.

Reference is now made to FIG. 2A, which is a simplified line drawing illustration of a system for producing a CGH image according to an example embodiment of the invention.

FIG. 2A shows the following components: three coherent light sources such as a red laser 202, a green laser 203 and a blue laser 204; a beam splitter 206; an optic wedge 208 such as, by of a non-limiting example a prism; a SLM 210; and an optional focusing optical component 212.

In some embodiments the optic wedge 208 is a transparent component, optionally placed with a first side of the transparent component facing the SLM 210 and a second side at an angle A 225 to a plane of the SLM 210.

In some embodiments index matching fluid (not shown) is optionally placed between the wedge 208 and the SLM 210.

A description is now provided of a way in which light passes from the light sources toward a location of a CGH image (not shown in FIG. 2A).

Coherent light 213 is optionally produced by any one of the coherent light sources 202 203 204, which may also be cycled to produce light in their corresponding three colors.

The coherent light 213 is reflected off a partially transmitting surface 214 in the beam splitter 206, continuing as coherent light 215 toward the wedge 208, and through the wedge 208 as coherent light 217. The coherent light 217 is optionally modulated by the SLM 210, and travels back as modulated light 219.

However, light 231 is also potentially reflected off a surface of the wedge 208. Such light may potentially produce background noise in a Fresnel CGH image and a ZOD bright spot in a Fourier CGH image.

The modulated light 219 travels back approximately along the path it came, as modulated light 221, which passes through the partially transmitting surface 214 in the beam splitter 206, emerging from the beam splitter 206 as modulated light 223 producing a holographic image 224 viewed by a viewer 222.

The approximate direction of the modulated light 219 is due to an optional change in the direction of the modulated light 219 which can be effected by the modulation of the SLM 210, which can redirect the light to a direction in a range of angles relative to the direction of the coherent light 217.

In some embodiments the angle A 225 is optionally determined according to the following equations:

$$\delta \approx -A(n-1) \quad \text{Equation 1}$$

where A is a head angle of the wedge, equivalent to angle A 225; $\delta$ is a tilt angle of the light 221 relative to the light 219, n is an index of refraction of the wedge material, and 2(A+$\delta$) is a reflection angle of light 231 from the surface 207.

In some embodiments, in order to diffract the reflection 231 away from the modulated light 221 the diffraction angle $\theta_{diff}$ of the SLM complies with:

$$2(A+\delta) > \theta_{diff}$$

By way of a non-limiting example, for glass (n=1.5), for a diffraction angle of 1.4 degrees (0.024 rad):

$$2\left(A + \frac{A}{2}\right) > 0.024 \text{ rad } A = \text{ and thus } A > 0.008 \text{ rad} \cong 0.5 \text{ deg.}$$

More details about the change in direction is described below, with reference to FIG. 3A, but the change in direction holds also for other embodiments described herein.

In some embodiments the modulated light 223 passes through one or more optional focusing optical component(s) 212.

The direction of the modulated light 223 defines a direction of the optical axis 220.

The light 231 potentially reflected off the surface of the wedge 208 passes through the partially transmitting surface 214 in the beam splitter 206 as light 233, emerging from the beam splitter 206 as light 235, in a different direction from the modulated light 223, a direction which is off-axis relative to the optical axis 220.

In some embodiments the system of FIG. 2A is implemented without the optional focusing optical component(s) 212. In such embodiments the system optionally produces holographic images named Fresnel holographic images, or Fresnel CGH images. In such images the Zero Order Diffraction is of zero-order optical noise.

In such embodiments FIG. 2A describes a method for removing non-diffracted light from a Fresnel CGH image.

Reference is now made to FIG. 2B, which is a simplified line drawing illustration of the system of FIG. 2A according to an example embodiment of the invention.

FIG. 2B shows the following components of FIG. 2A: three coherent light sources such as a red laser 202, a green laser 203 and a blue laser 204; a beam splitter 206; an optic wedge 208 such as, by of a non-limiting example a prism; a SLM 210; and an optional focusing optical component 212.

In some embodiments index matching fluid (not shown) is optionally placed between the wedge 208 and the SLM 210.

A description is now provided of a way in which light passes from the light sources toward a location of a CGH image 245.

Coherent light 213 is optionally produced by any one of the coherent light sources 202 203 204, which may also be cycled to produce light in their corresponding three colors.

The coherent light 213 is reflected off a partially transmitting surface 214 in the beam splitter 206, continuing as coherent light 215 toward the wedge 208, and through the wedge 208 as coherent light 217. The coherent light 217 is optionally modulated by the SLM 210, and travels back as modulated light 219.

However, light 231 is also potentially reflected off a surface of the wedge 208. Such light may potentially produce a ZOD bright spot.

The modulated light 219 travels back along the path it came, as modulated light 221, which passes through the partially transmitting surface 214 in the beam splitter 206, emerging from the beam splitter 206 as modulated light 223.

In some embodiments the modulated light 223 passes through one or more optional focusing optical component(s) 242.

In some embodiments the optional focusing optical component(s) 242 include more than one lens.

The description of FIG. 2B describes a method for removing non-diffracted light (ZOD) from a Fourier CGH image.

The direction of the modulated light 223 defines a direction of the optical axis 220. Along the direction of the modulated light 223 and the optical axis 220 lies a location where the CGH image 245 is imaged, that is the CGH image 245 is in focus.

The light 231 potentially reflected off the surface of the wedge 208 passes through the partially transmitting surface 214 in the beam splitter 206 as light 233, emerging from the beam splitter 206 as light 235, in a different direction from the modulated light 223, a direction which is off-axis relative to the optical axis 220.

FIG. 2B shows the light 235 continuing in an off-axis direction, passing through the optional focusing optical component(s) 242, and continuing as light 241, eventually producing a ZOD bright spot 243. The bright spot 243 is away from a location of the CGH image 245, away from where the CGH image 245 is in focus.

In some embodiments the ZOD bright spot 243 is not seen by an observer's eye, due to being away on the side of the CGH image 245.

In some embodiments the ZOD bright spot 243 is optionally blocked by a ZOD blocker (not shown in FIG. 2B). The ZOD blocker can block the off-axis ZOD bright spot without blocking light for producing the CGH image 245.

FIGS. 2A and 2B show example embodiments of directing light of the ZOD bright spot in a direction different than the light for producing the CGH image.

In some embodiments optional index matching fluid reduces reflections from the interface between the SLM 210 and the wedge 208.

In some embodiments the light 231 reflected from the front of the wedge 208 is optionally reflected at an angle larger than diffraction angles of the light diffracted from the SLM 210. In other words, the direction of the light 231 is further away from a normal to a front surface 207 of the wedge 208 than a central direction of the modulated light 221, or even of any component of the modulated light 221.

FIG. 2A demonstrates an example embodiment which reduces ZOD bright spot intensity from front face reflection of light. The reflected light from the front face generates a ZOD spot that is outside the of the CGH image area (see the dark spot 243 in FIG. 2B).

FIG. 2B demonstrates an example embodiment in which the shifted reflected light beam generates a shifted ZOD bright spot.

Figure 3A:
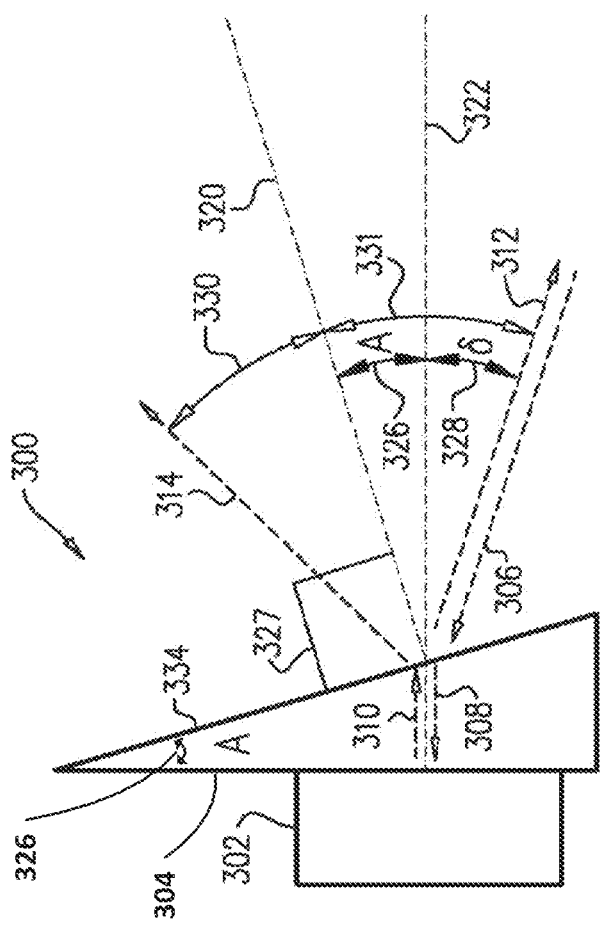
FIG. 3A is a simplified line drawing illustration of a wedge placed next to an SLM according to an example embodiment of the invention.

Reference is now made to FIG. 3A, which is a simplified line drawing illustration of a wedge placed next to an SLM according to an example embodiment of the invention.

FIG. 3A shows a SLM 302 and a wedge 304. The wedge 304 is placed adjacent to the SLM 302. As described above, an index matching fluid or other index matching material may optionally also be placed between the SLM 302 and the wedge 304.

In is noted that where the term wedge is used in the present specification and claims, a prism may also be understood as an example embodiment of a wedge.

Light 306 impinging upon the wedge 304 changes direction when entering the wedge 304 and continues inside the wedge 304 as light 308. The change in direction depends upon an index of diffraction on an outside of the wedge 304, where the light 306 travels, and on an index of diffraction on an inside of the wedge 304 where the light 308 travels. In a typical embodiment the outside of the wedge 304 is air, and the index of diffraction of air is substantially 1.

Light 306 impinging upon the wedge 304 is also reflected from a face 334 of the wedge 304 as light 314. The light 314 reflects off the wedge 304 face 334 at an angle 330 from a direction 320 normal to the face 334 of the wedge 304. The angle 330 of the reflected light 314 from the direction 320 normal to the face 334 of the wedge 304 is equal to an angle 331 of the light 306 to the direction 320 normal to the face 334 of the wedge 304.

The light 308 illuminates the SLM 302, and reflects as modulated light 310, which exits the wedge 304 as light 312, at a same angle and opposite direction as the light 306 entered the wedge 304.

In some embodiments a front surface or cover of an SLM is optionally made wedge or prism like, so that light that is reflected from the front face 334 of the wedge 304 is reflected at an angle larger than a diffraction angle of light reflected from the SLM.

For a square-pixel SLM, a diffraction angle for the modulated light 310 relative to a normal to the face of the SLM 302 is typically up to a wavelength of the light divided by twice a pixel length. For an example of visible light, with a wavelength of half a micron, for example, and an example pixel length of 8 microns, the above-mentioned diffraction angle is: $\theta_{diff} \cong 1/32$ radians. A tilt angle $\delta$ 328 generated by the wedge angle is $\cong A(n-1)$, where A 326 is the wedge angle and n is the wedge 304 refractive index. As shown in FIG. 3A, a reflection 314 from a front face 334 of the wedge 304 is at a same angle as an angle of incident light 306 with respect to the direction 320 of the wedge 304 face 334 normal.

In some embodiments, the light 308 reaches the SLM 302 at an approximately normal incident angle, as shown in FIG. 3A, so the wedge head angle A 326 is equal to the wedge normal angle with respect to the direction of the SLM normal. In some embodiments, the angle of the reflected light 314 exceeds the diffraction angle, that is: $2(\delta+A) \geq \theta_{diff}$. In embodiments where this constraint is optionally maintained, the head angle is: $A \geq \theta_{diff}/(2n)$, which, when using glass (typical refractive index of approximately $n_{glass} \cong 1.5$) in air (typical refractive index of approximately $n_{air}=1$), is typically $A \geq 1/3 * \theta_{diff} \cong 1/96$ radians.

In some embodiments, the reflected angle 330 of the reflected light 314 is larger than the angle 331 of the diffraction light 312.

In some embodiments, the wedge 304 surface 334 is implemented as a blazed surface, producing an optically effective wedge less thick than the wedge 304.

In some embodiments the wedge 304 is replace with a blazed grating. In such embodiments the modulated light 312 shifts away from the reflected light 314 which can produce a zero order diffraction bright spot, as well as first order diffraction and other orders of diffraction.

Figure 3B:
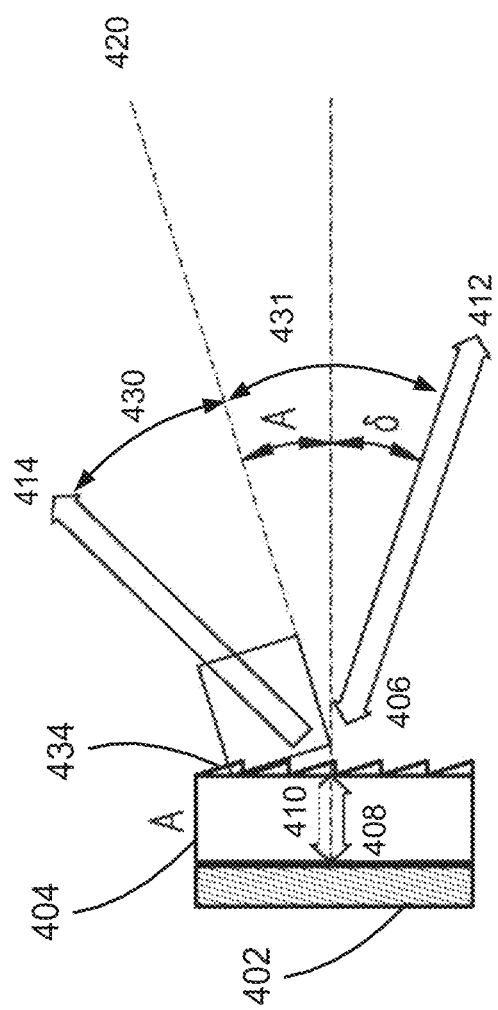
FIG. 3B is a simplified line drawing illustration of a blazed grating placed next to an SLM according to an example embodiment of the invention.

Reference is now made to FIG. 3B, which is a simplified line drawing illustration of a blazed grating placed next to an SLM according to an example embodiment of the invention.

FIG. 3B shows a SLM 402 and a blazed grating 404. The blazed grating 404 is placed right next to the SLM 402. As described above, an index matching fluid may optionally also be placed between the SLM 402 and the blazed grating 404.

Light 406 impinging upon the blazed grating 404 changes direction when entering the blazed grating 404 and continues inside the blazed grating 404 as light 408. The change in direction depends upon an index of diffraction on an outside of the blazed grating 404, where the light 406 travels, and on an index of diffraction on an inside of the blazed grating 404 where the light 408 travels. In a typical embodiment the outside of the blazed grating 404 is air, and the index of diffraction of air is substantially 1.

Light 406 impinging upon the blazed grating 404 is also reflected from angled surfaces 434 of a face of the blazed grating 404 as light 414. The light 414 reflects off the angled surfaces 434 of the blazed grating 404 at an angle 430 from a direction 420 normal to the angled surfaces 434 of the blazed grating 404. The angle 430 of the reflected light 414 from the direction 420 normal to the angled surfaces 434 of the blazed grating 404 is equal to an angle 431 of the light 406 to the direction 420 normal to the angled surfaces 434 of the blazed grating 404.

The light 408 illuminates the SLM 402, and reflects as modulated light 410, which exits the blazed grating 404 as light 412, at a same angle and opposite direction as the light 406 entered the blazed grating 404.

In some embodiments an SLM includes several layers of different materials, with different refractive indexes, on a face of the SLM. The layers may include, for example: a face of the SLM; a transparent electrode, optionally made of Indium tin oxide (ITO); a Liquid Crystal (LC); a layer on a back face of the SLM; and a stack of such layers. Each interface between different refractive indexes may reflect light into the ZOD bright spot.

In some embodiments, in order to diverge these ZOD reflections, each layer is optionally designed in a wedge configuration.

Figure 4A:
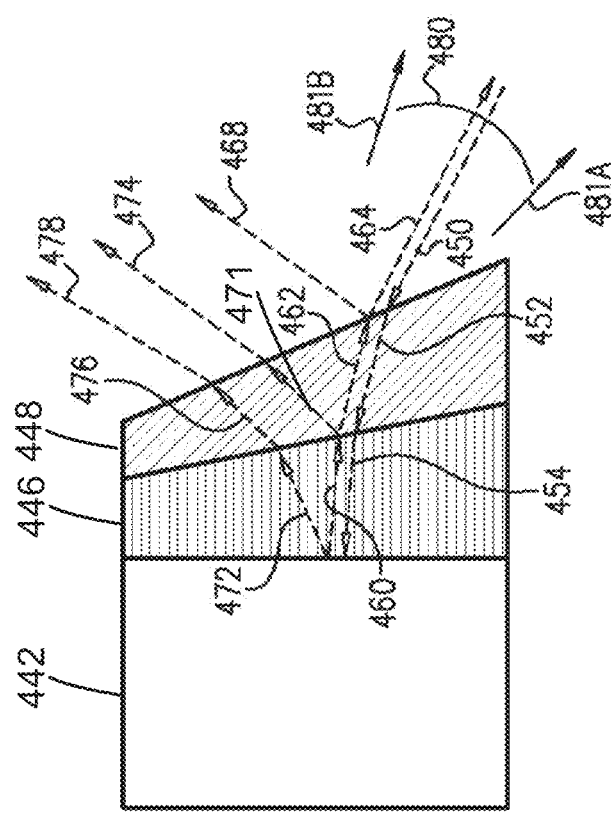
FIG. 4A is a simplified line drawing illustration of a stack of wedge shaped layers placed next to an SLM according to an example embodiment of the invention.

Reference is now made to FIG. 4A, which is a simplified line drawing illustration of a stack of wedge shaped layers placed next to an SLM according to an example embodiment of the invention.

FIG. 4A shows a SLM 442 and a stack of two wedge shaped layers 446 448. The wedge shaped layers 446 448 are placed right next to the SLM 442. As described above, an index matching fluid may optionally also be placed between the SLM 442 and the wedge shaped layers 446 448 and/or between the wedge shaped layers 446 448.

FIG. 4A shows a stack of two wedge shaped layers 446 448. However, various embodiments are contemplated, including a stack of wedge shaped layers in any number ranging from 2 to 3, to 4, to 5, to 6, to 7, and so on up to tens and hundreds of layers. Furthermore, various embodiments are contemplated, where some of the layers are not necessarily wedge shaped, and wedge shaped layers may be stacked over, under, or interspersed with layers which are not wedge shaped.

Light 450 impinging upon the first layer 448 changes direction when entering the first layer 448 and continues inside the first layer 448 as light 452.

The light 452 impinges upon the second layer 446, changes direction when entering the second layer 446 and continues inside the second layer 446 as light 454.

The light 454 impinges upon the SLM 442, and is partly reflected by the SLM 442 as reflected light 472, and partly modulated by the SLM 442, producing modulated light 460.

The modulated light 460 exits the second layer 446 as modulated light 462, at a same angle and opposite direction as the light 452 which entered the second layer 446. The modulated light 462 exits the first layer 448 as modulated light 464, at a same angle and opposite direction as the light 450 which entered the first layer 448.

The various references to light are drawn as one example ray of light 464, however, the various light 'rays' are actually broader than the example drawing of a ray or arrow, they are actually sheaves of light. For example the modulated light 464 for producing a holographic image (not shown) is a cone of light 480, between directions 481A and 481B.

Light 450 impinging upon the first layer 448 is also reflected from an angled surface of a face of the first layer 448 as light 468. Light 452 impinging upon the second layer 446 is also potentially reflected from an angled interface surface of a face of the second layer 446 as light 471.

In some embodiments one or more of the layers are optionally produced with a deflection angle of the reflected light 471, that is larger than a diffraction angle in the material 462. The diffraction angle in the material is a maximal diffraction angle in air divided by the refractive index, $n_{layer}$ at each layer.

In some embodiments a head angle A in wedge shaped layers is optionally produced to be: $A_{layer} \geq \theta_{diff}/(2n_{layer})$ where $\theta_{diff}$ is an angle of diffraction in the layer, and $n_{layer}$ is a diffraction coefficient of the layer.

FIG. 4A shows a non-limiting example of a multi-layer structure where every layer 446 448 other than the SLM 442 has a wedge or prism shape.

In some embodiments, the SLM 442 is optionally also constructed as a wedge shape.

In some embodiments, each row or each column of cells, or pixels, of the SLM 442 is optionally constructed as a wedge shape.

In some embodiments, each cell, or pixel, of the SLM 442 is optionally constructed as a wedge shape.

In some embodiments, each liquid crystal (LC) cell, or pixel, of the SLM 442 is optionally constructed as a wedge shape.

In some embodiments, each row of LC cells, or pixel, of the SLM 442 is optionally constructed as a wedge shape.

In some embodiments a varying optical path of light within the wedge shaped SLM is optionally compensated for.

In some embodiments, such compensation is optionally done electronically, by way of a non-limiting example by thinner areas in the SLM having different voltages across the thinner areas than across thicker areas, to induce a similar phase shift as the thicker areas of the SLM.

In some embodiments, such compensation is optionally done electronically, by way of a non-limiting example by thinner areas in the SLM having different electric potentials across the thinner areas than across thicker areas, to induce a similar phase shift as the thicker areas of the SLM.

In some embodiments the compensation is optionally generated by a combination of electrodes with varying potential that are placed along the wedge, replacing a conventional common ground electrode.

In some embodiments, compensating the optical path difference along the wedge is performed by varying a voltage at each pixel of the SLM according to its thickness, typically determined by the pixel location on the wedge.

In some embodiments compensation for differences optical path length in the wedge structure is performed by optionally varying boundary conditions in the SLM. By way of a non-limiting example, the varying of the boundary conditions may be performed by optionally varying a local voltage on the SLM, optionally controlling orientation of liquid crystal (LC) molecules in the SLM.

Figure 4B:
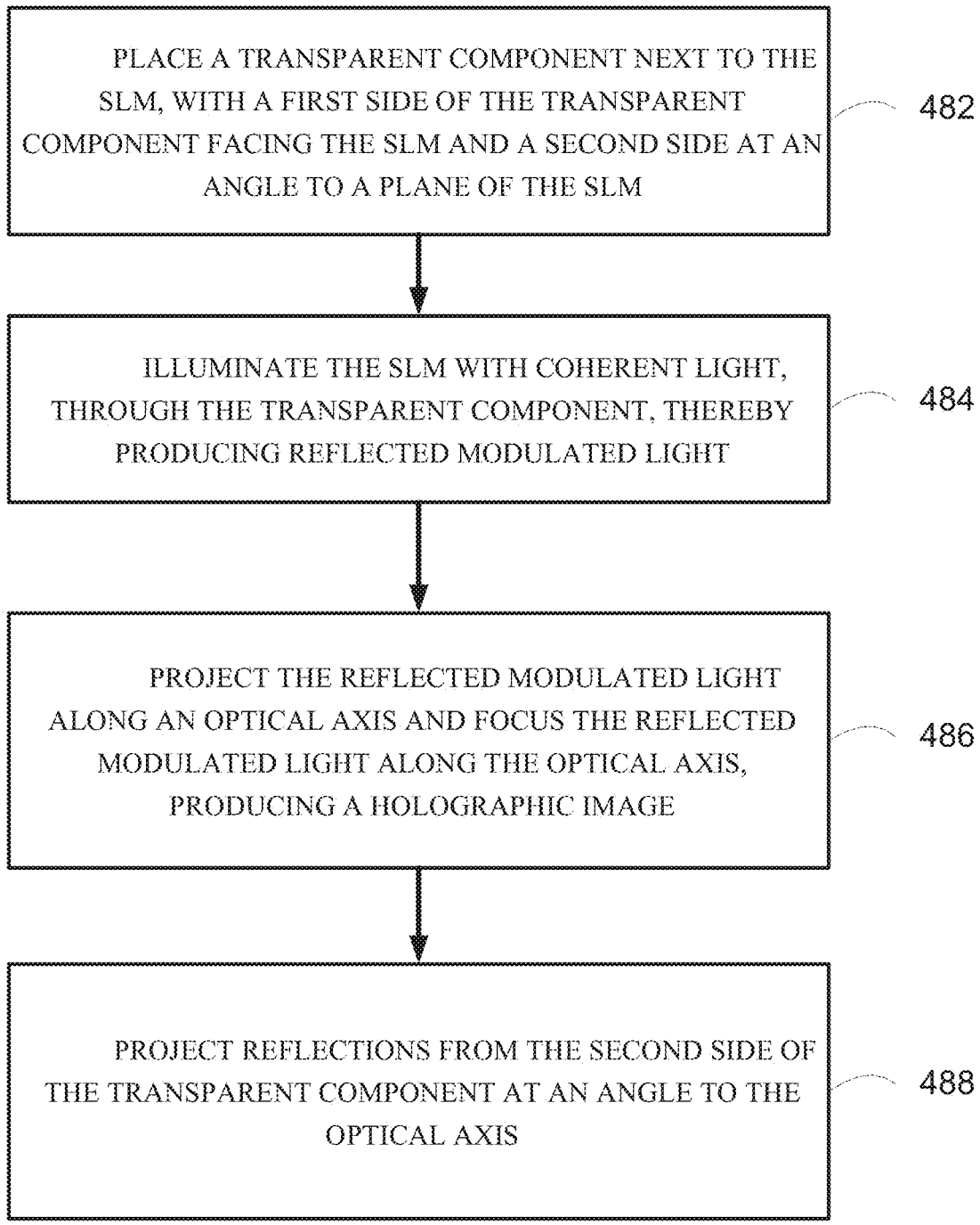
FIG. 4B is a simplified flow chart illustration of a method for directing light reflected from a Spatial Light Modulator (SLM) away from a direction of projecting a holographic image generated by the SLM according to an example embodiment of the invention.

Reference is now made to FIG. 4B, which is a simplified flow chart illustration of a method for directing light reflected from a Spatial Light Modulator (SLM) away from a direction of projecting a holographic image generated by the SLM according to an example embodiment of the invention.

The method of FIG. 4B includes:

placing a transparent component next to the SLM, with a first side of the transparent component facing the SLM and a second side at an angle to a plane of the SLM (482);

illuminating the SLM with coherent light, through the transparent component, thereby producing reflected modulated light (484); and projecting the reflected modulated light along an optical axis and focusing the reflected modulated light along the optical axis, producing a holographic image (486);

wherein reflections from the second side of the transparent component are reflected at an angle to the optical axis (488).

In some embodiments the reflection angle is controlled, by an optical design, to be larger than the diffraction angle $\theta_{diff}$ mentioned above.

Apodization

A ZOD bright spot intensity is partially caused by reflection of light from features of a size that is in the order of the SLM size. For example, light reflected from a front surface of an SLM doesn't pass through the SLM, is not modulated to form a specific image, and diffracts to the ZOD bright spot. An SLM front surface with a rectangular or square shape produces a ZOD bright spot with an intensity distribution typically shaped in a "sinc-function" pattern, with side lobes. The side-lobes include a few percent of the total ZOD intensity. Due to a high ZOD intensity it is useful, in some embodiments, to block a large portion, for example above 99.9%, of the ZOD intensity, which causes some embodiments of a ZOD blocking spot to cover up to at least a first, sometimes more, of the side-lobes. Such a blocking spot may potentially block a large portion of an image.

An aspect of some embodiments of the invention includes reducing intensity and spatial extent of the ZOD bright spot by placing an apodization filter in front of an SLM producing the holographic image.

Apodization is an optical filtering technique. It is a technical term for changing a shape of a mathematical function, in the present specification and claims the term is used for changing a shape of an intensity profile of light travelling from the SLM.

In some embodiments apodization modulates amplitude of light leaving SLM boundaries, or boundaries of an aperture. The apodization reduces an intensity of side-lobes of the ZOD bright spot, and a ZOD blocker is optionally made smaller.

In some embodiments apodization can be such that an average amplitude at an edge of the SLM, be it rectangular, square, or some other shape, is optionally reduced by 50%. Additional values for percentage of reduction include percentage values in a range from 5% to 99%.

In some embodiments, the apodization provides a smooth intensity gradient profile. The smooth amplitude edge is optionally extended from the boundaries of the SLM to a distance in a range of 1 to 2 to 500 wavelengths and more. The distance corresponds, in case of visible light, to approximately between 0.5 to 1 to 250 microns from the SLM edge for a non-limiting example of green light which has 0.5 micron wavelength.

The edge of the SLM is considered, in the present specification and claims, as a location where the amplitude vanishes.

In some embodiments the edge of the SLM is optionally defined by illuminating only part of the SLM, the edge being where illumination drops to below, by way of a non-limiting example, 10% of the maximal intensity.

In some embodiments the edge of the SLM is optionally defined by placing a filter in front of the SLM, the filter reducing intensity of light passing through the filter.

In some embodiments apodization is achieved by placing an optic stop along the optical axis leading from the SLM to a location of a holographic image, optionally at a location in a vicinity of a location where a real SLM image is in focus.

In some embodiments apodization is achieved by placing an optic stop along an optical axis leading from coherent illumination toward the SLM, so the optic spot performs apodization to coherent light illuminating the SLM.

In some embodiments the edge of the SLM is optionally smaller than the physical boundaries of the SLM.

Figure 5B:
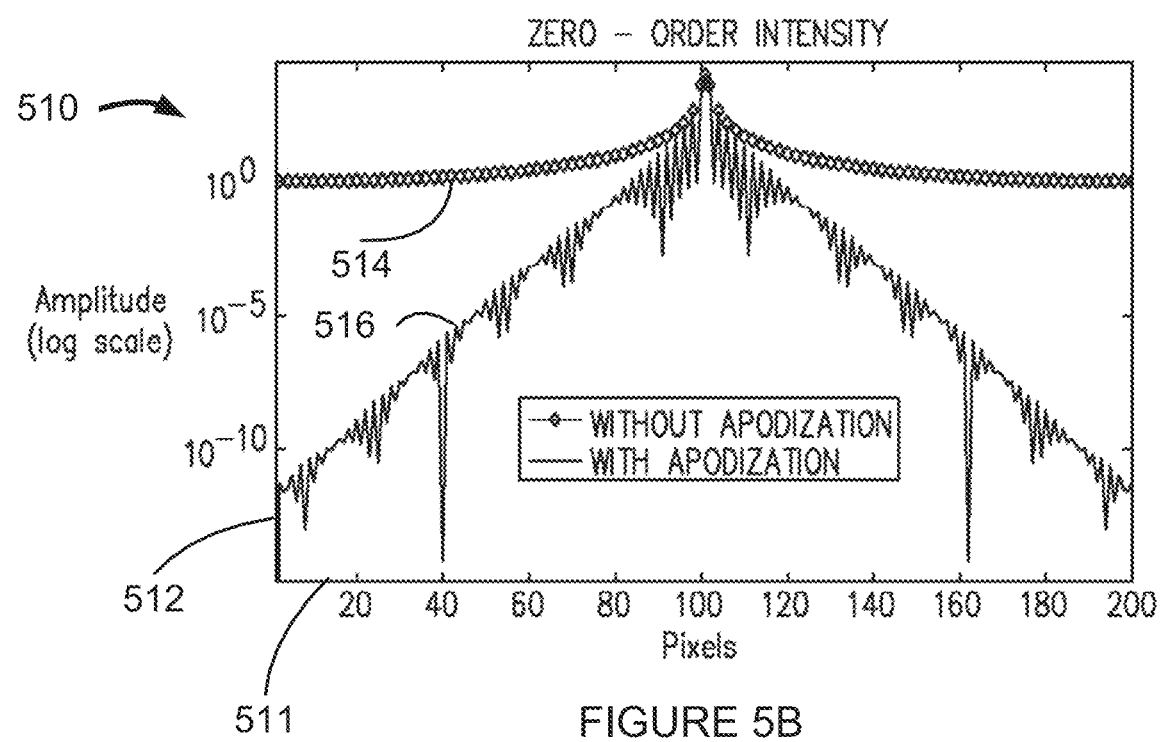
FIG. 5B is a graph showing normalized intensity of the light of FIG. 5A when the light reaches a plane of zero-order diffraction, according to an example embodiment of the invention.
Figure 5A:
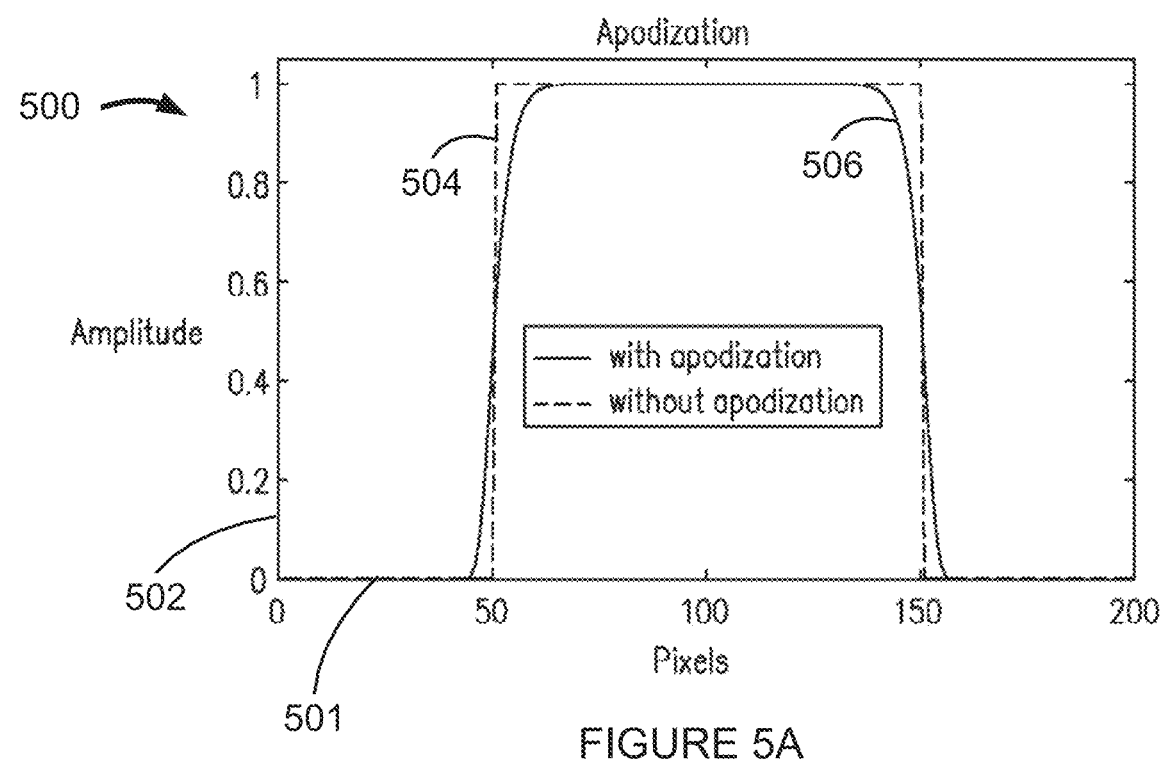
FIG. 5A is a graph showing normalized light intensity leaving from at least a portion of an SLM according to an example embodiment of the invention.

Reference is now made to FIG. 5A, which is a graph showing normalized light intensity leaving from at least a portion of an SLM according to an example embodiment of the invention.

FIG. 5A is a graph 500, having an x-axis 501 in units of SLM pixels, and a y-axis 502 in normalized light intensity.

FIG. 5A shows, using a dashed line 504, intensity of light leaving the SLM without apodization, and using a solid line 506, intensity of light leaving the SLM with apodization. The maximum intensity of the light is as a normalized value of "1", without units.

Reference is now made to FIG. 5B, which is a graph showing normalized intensity of the light of FIG. 5A when the light reaches a plane of zero-order diffraction, according to an example embodiment of the invention.

FIG. 5B is a graph 510, having an x-axis 511 in units of length expressed as a length of pixels of the SLM of FIG. 5A, and a y-axis 512 in a logarithmic scale of normalized light intensity.

FIG. 5B shows, using a first line 514, intensity of light at the plane of zero-order diffraction without apodization, and using a second line 516, intensity of light at the plane of zero-order diffraction with the apodization of the solid line 506 of FIG. 5A.

The second line 516 of shows how apodization reduces an intensity of the side-lobes of the zero order at the focal plane.

In the non-limiting example embodiment of FIGS. 5A and 5B the edge is not the physical edge of the SLM, which is at pixels 1 and 200. The edge is the interface between vanishing amplitude and non-vanishing amplitude, which for the dashed line 504 of FIG. 5A is at pixels 50 and 150.

FIGS. 5A and 5B show a non-limiting example with and without apodization at the SLM and how apodization reduces intensity of side-lobes of the zero order at a focal plane.

Figure 5C:
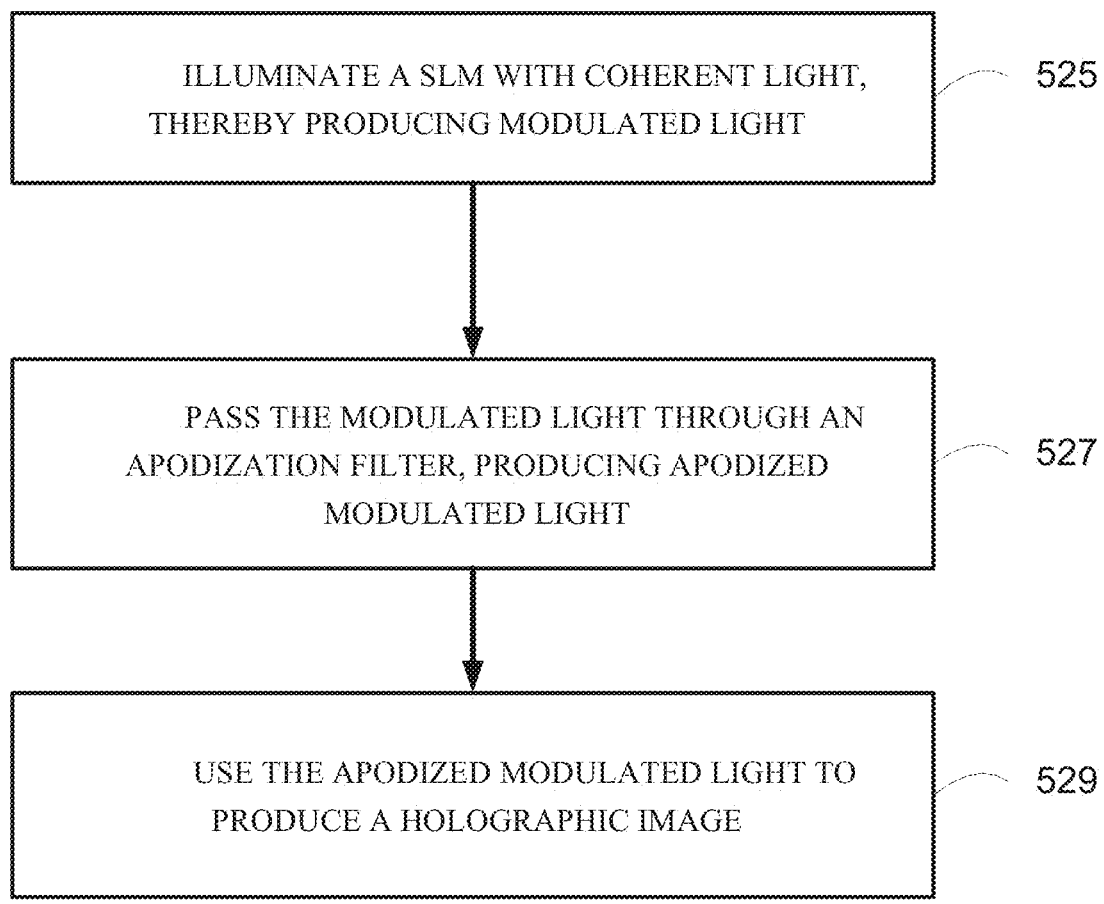
FIG. 5C is a simplified flow chart illustration of a method for reducing Zero Order Diffraction (ZOD) bright spot intensity in Spatial Light Modulator (SLM) projection of holographic images according to an example embodiment of the invention.

Reference is now made to FIG. 5C, which is a simplified flow chart illustration of a method for reducing Zero Order Diffraction (ZOD) bright spot intensity in Spatial Light Modulator (SLM) projection of holographic images according to an example embodiment of the invention.

The method of FIG. 5C includes:
illuminating a SLM with coherent light, thereby producing modulated light (525); and
passing the modulated light through an apodization filter, producing apodized modulated light (527); and
using the apodized modulated light to produce a holographic image (529).

In some embodiments the apodization filter is optionally placed just before the SLM. In some embodiments the apodization filter is optionally placed at a vicinity of an SLM real-image.

Figure 5D:
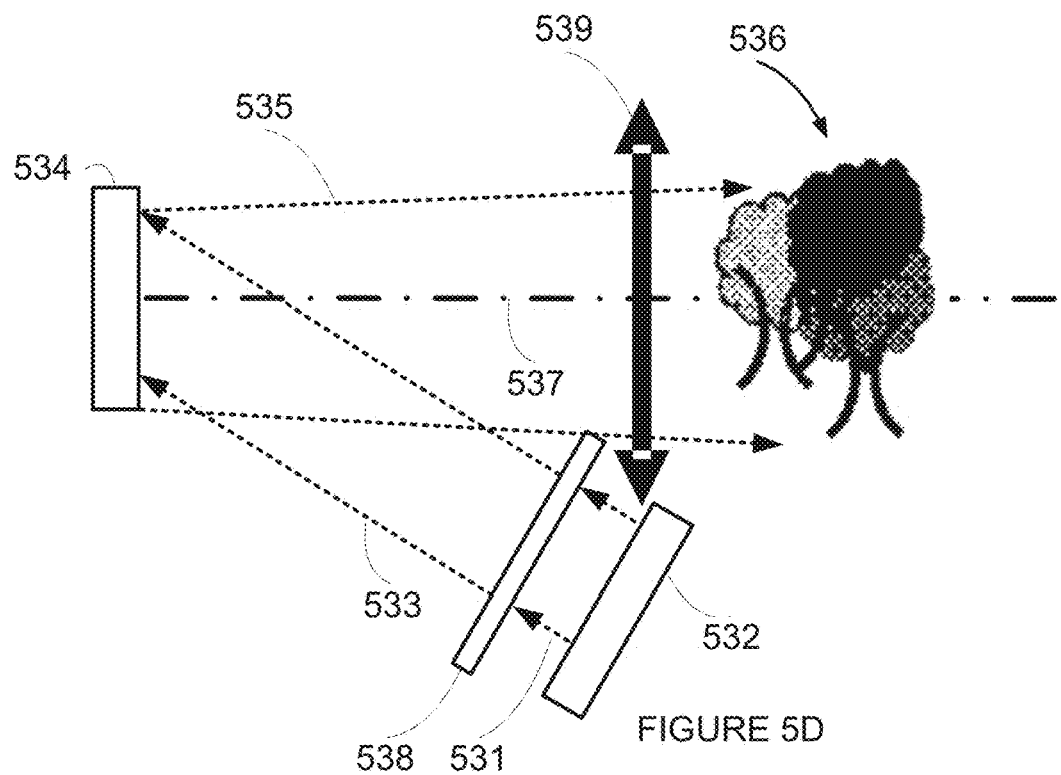
FIG. 5D is a simplified line drawing illustration of a system for displaying a holographic image and reducing an intensity of a Zero Order Diffraction (ZOD) bright spot associated with the holographic image according to an example embodiment of the invention.

Reference is now made to FIG. 5D, which is a simplified line drawing illustration of a system for displaying a holographic image and reducing an intensity of a Zero Order Diffraction (ZOD) bright spot associated with the holographic image according to an example embodiment of the invention.

FIG. 5D shows a display which includes apodizing coherent illumination which is used for producing the holographic image.

FIG. 5D shows a coherent light source 532, an apodizing filter 538, a SLM 534 and a focusing optical element such as a lens 539.

In some embodiments a distance of the apodizing filter 538 from the SLM 534 is less than a distance z which corresponds to a Fresnel number Nf>50, where the Fresnel number is defined as follows:

$$N_f = \frac{w^2}{\lambda z}$$

Where w is a width of a light beam or a width of the SLM, $\lambda$ is a wavelength of the light, and z is the distance Light 531 from the coherent light source 532 passes through the apodizing filter 538, emerging as light 533. The light 533 impinges upon the SLM 534, emerging as modulated light 535 along an optic axis 537, passes through the lens 539, forming a holographic image 536.

Figure 5E:
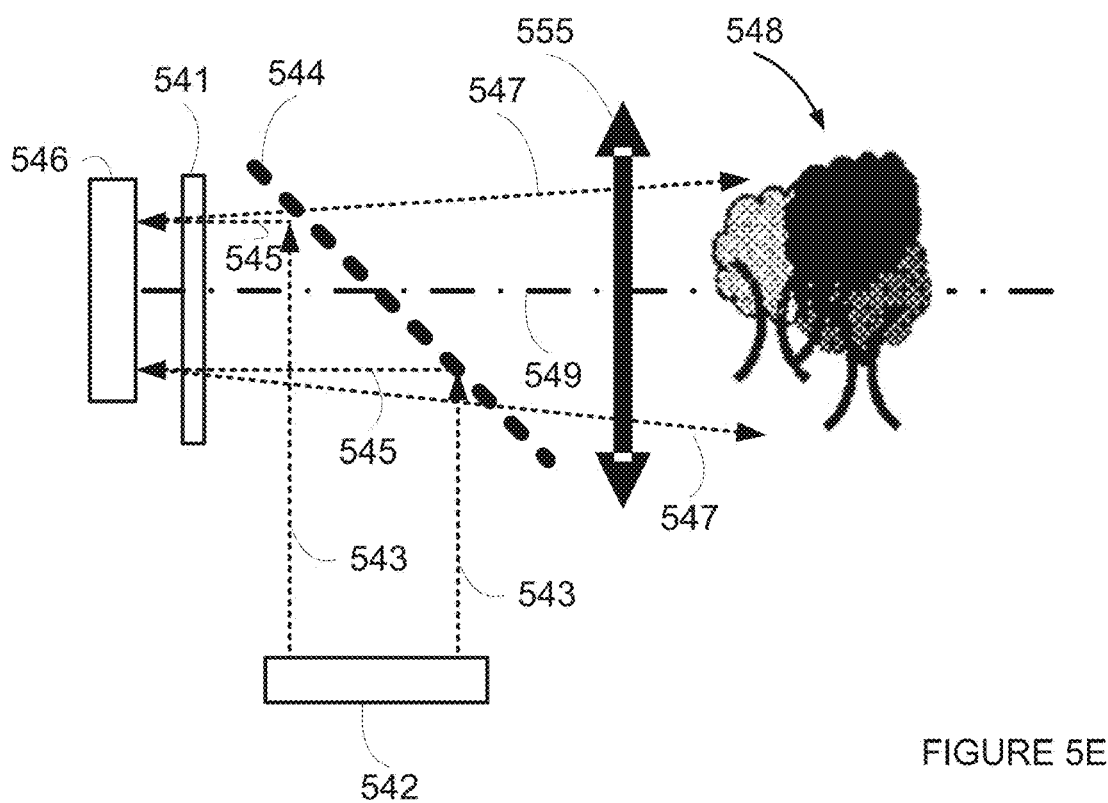
FIG. 5E is a simplified line drawing illustration of a system for displaying a holographic image and reducing an intensity of a Zero Order Diffraction (ZOD) bright spot associated with the holographic image according to an example embodiment of the invention.

Reference is now made to FIG. 5E, which is a simplified line drawing illustration of a system for displaying a holographic image and reducing an intensity of a Zero Order Diffraction (ZOD) bright spot associated with the holographic image according to an example embodiment of the invention.

FIG. 5E shows a display which includes apodizing coherent illumination and/or apodizing modulated light from an SLM which are used for producing the holographic image.

FIG. 5E shows a coherent light source 542, a semi-transparent/semi reflecting mirror 544 (or a beam splitter 544), an apodizing filter 541, a focusing optical element such as a lens 555, and a SLM 546.

Light 543 from the coherent light source 542 impinges upon the beam splitter 544, changing direction and emerging as light 545. The light 545 passes through the apodizing filter 541, impinges upon the SLM 546, and continues as modulated light 547, again passing through the apodizing filter 541 and the semi-transparent/semi reflecting mirror 544, and the lens 555. The modulated light 547 travels along an optic axis 549, forming a holographic image 548.

Figure 5F:
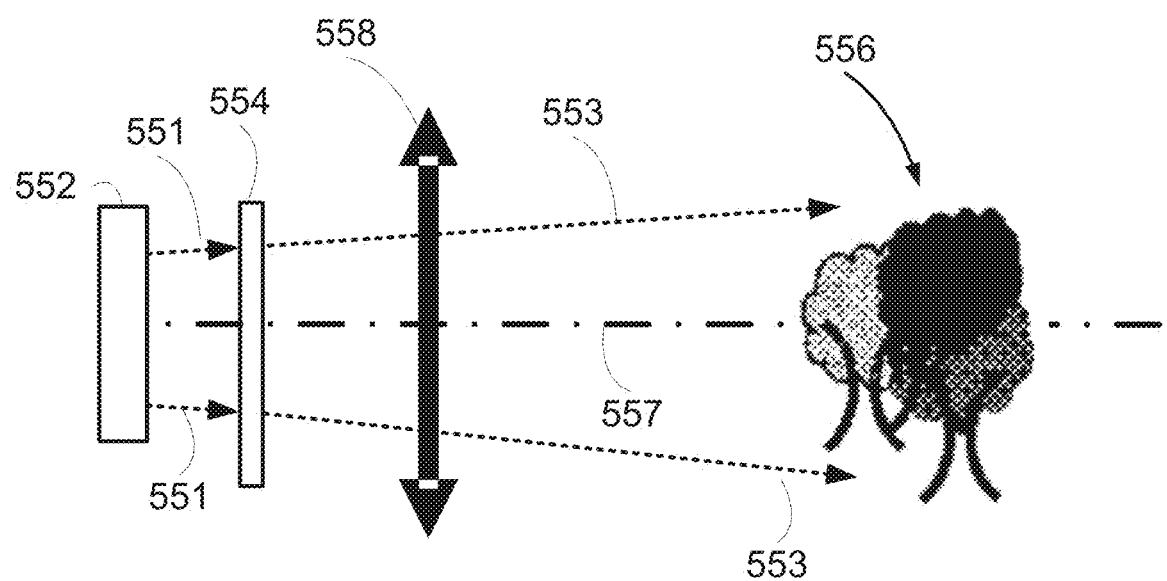
FIG. 5F is a simplified line drawing illustration of a system for displaying a holographic image and reducing an intensity of a Zero Order Diffraction (ZOD) bright spot associated with the holographic image according to an example embodiment of the invention.

Reference is now made to FIG. 5F, which is a simplified line drawing illustration of a system for displaying a holographic image and reducing an intensity of a Zero Order Diffraction (ZOD) bright spot associated with the holographic image according to an example embodiment of the invention.

FIG. 5F shows a display which includes apodizing already modulated light which is used for producing the holographic image.

FIG. 5F shows a SLM 552, an apodizing filter 554 and a focusing optical element such as a lens 558.

Modulated light 551 from the SLM 552, passes through the apodizing filter 554, emerging a modulated apodized light 553, passes through the lens 558, and travels along an optic axis 557, forming a holographic image 556.

FIG. 5F does not show a source for coherent illumination. FIG. 5F is appropriate for illustrating both a SLM 552 which is a transmissive SLM, and a SLM 552 which is a reflective SLM.

Blocking and Filling

An aspect of some embodiments of the invention includes blocking a ZOD bright spot, thereby producing a dark spot somewhere in a viewed image, and filling in the dark spot.

Reference is now made to FIGS. 6A-6E, which are simplified line drawing illustrations of a holographic display and a dark spot, and some example embodiments of filling in the dark spot according to example embodiments of the invention.

Figure 6A:
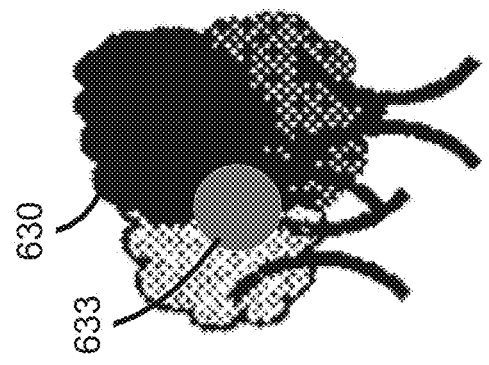
FIGS. 6A-6E are simplified line drawing illustrations of a holographic display and a dark spot, and some example embodiments of filling in the dark spot according to example embodiments of the invention.

FIG. 6A shows a holographic image 630, and a dark spot 631 within an area included in the holographic image 630, the dark spot 631 produced by blocking a ZOD bright spot present in the holographic image 630.

FIGS. 6B-6E show results of various example embodiments of filling in the dark spot according to example embodiments of the invention. FIGS. 6B-6E all show the holographic image 630, which would have a bright spot at a location of the dark spot 631 were it not for filling in the dark spot with fill-in light.

Figure 6B:
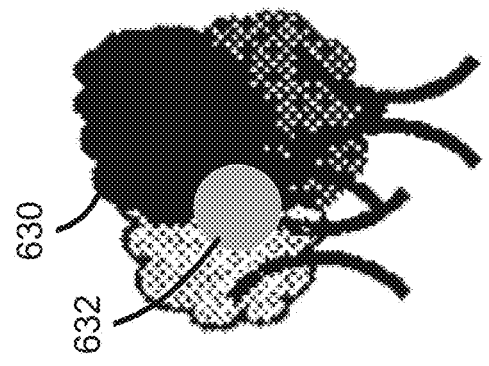

FIG. 6B shows a spot 632 lighted by fill-in lighting of uniform intensity.

Figure 6C:
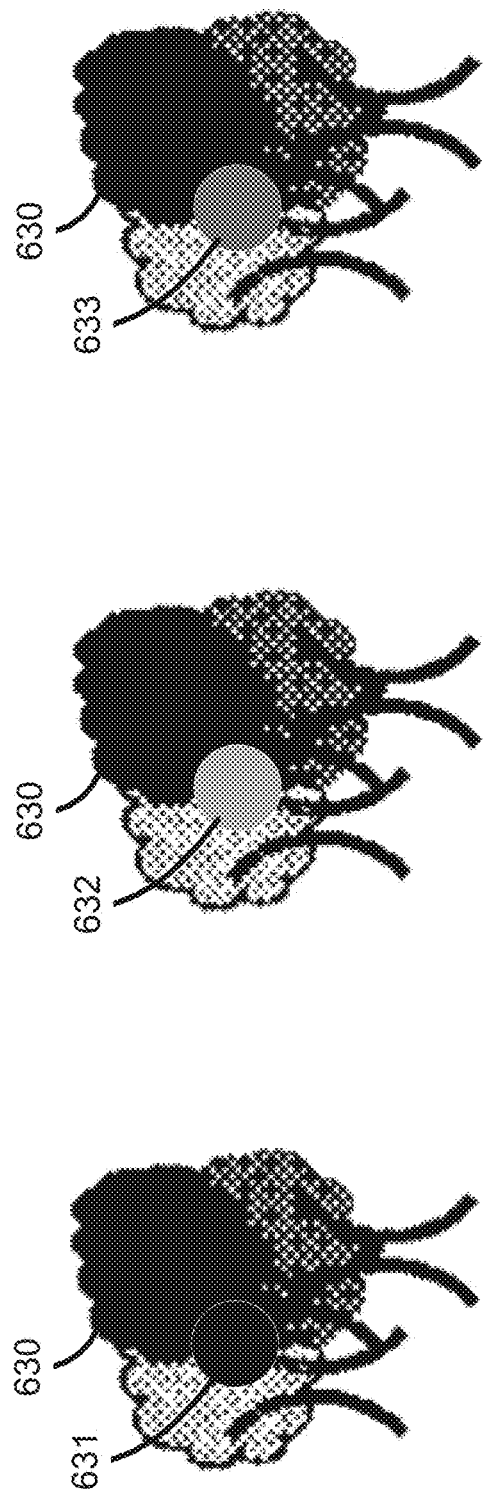

FIG. 6C shows a spot 633 lighted by fill-in lighting of uniform intensity, at an intensity equal to an average intensity of the holographic image in the area blocked by the dark spot.

Figure 6D:
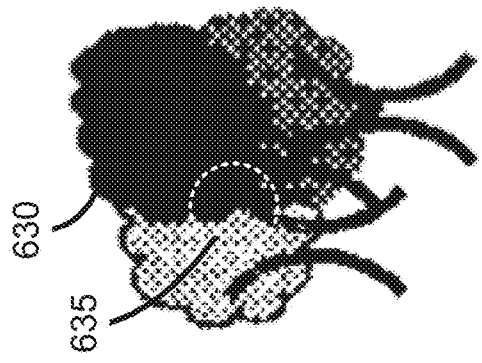

FIG. 6D shows a spot 634 filled in by a two-dimension image corresponding to the holographic image in the area blocked by the dark spot.

Figure 6E:
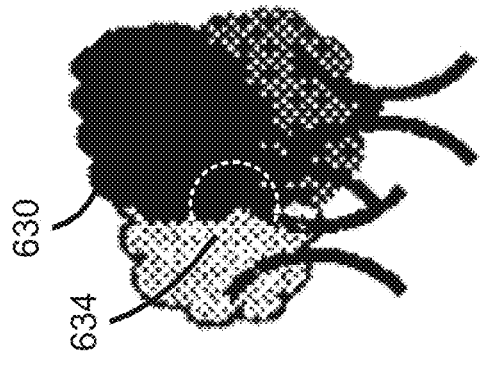

FIG. 6E shows a spot 635 filled in by a second three-dimension holographic image corresponding to the holographic image in the area blocked by the dark spot.

Figure 6F:
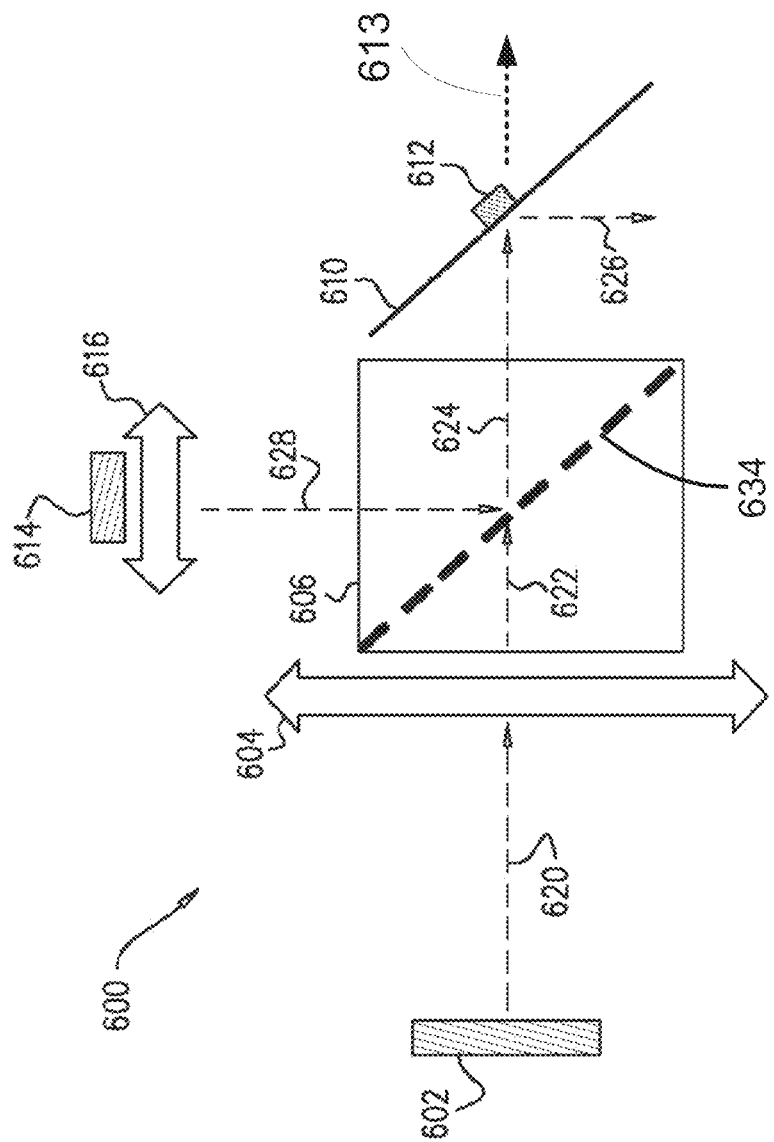
FIG. 6F is a simplified line drawing illustration of a display system for filling in a dark spot according to an example embodiment of the invention.

Reference is now made to FIG. 6F, which is a simplified line drawing illustration of a display system for filling in a dark spot according to an example embodiment of the invention.

FIG. 6F shows a simplified illustration of a display system 600 which includes:

a first SLM 602 sending modulated polarized light 620, through an optional focusing element 604 as modulated polarized light 622 into a beam splitter 606; and a second SLM 614 sending polarized light 628, optionally through an optional focusing element 616 as polarized light 628 into the beam splitter 606.

The modulated polarized light 622 and the polarized light 628 are optionally polarized perpendicularly to each other.

In some embodiments the modulated polarized light 622 and the polarized light 628 are each circularly polarized, optionally by quarter-wave plates following the SLM along the optical axis, one clockwise circularly polarized and the other anti-clockwise circularly polarized.

The modulated polarized light 622 and the polarized light 628 are combined in the beam splitter 606, at a plane 608, and the combination continues as combined light 624.

The combined light 624 reaches a mirror 610, which reflects most, but not all of the combined light 624.

The mirror 610 includes a section 612 treated to reflect the combined light 624 which has the polarization of the polarized light 628, and pass through a portion 613 of the combined light 624 which has the polarization of the modulated polarized light 622.

The modulated polarized light 622 is optionally light for producing a CGH image, which is optionally focused at the mirror 610, optionally by the optional focusing element 604. The modulated polarized light 622 includes light which potentially produces a ZOD bright spot. However, the section 612 is designed to pass the light polarized in the polarization of the modulated polarized light 622, and reflect the light polarized in the polarization of the polarized light 628.

The system 600 is optically designed so that an area of light from the modulated polarized light 622 which contains the ZOD bright spot passes through the section 612 of the mirror 610, and the rest of the area of the modulated polarized light 622 is reflected from the mirror 610.

Outside the section 612 of the mirror 610 all light from the combined light 624 is reflected.

The light reflected from the mirror 610 is referenced as light 626.

The system 600 is designed to provide light 626 which includes a combination of light for producing a CGH image, coming from the first SLM 602, minus light in a specific section 612 (which contains the ZOD bright spot), plus light coming from the second SLM 614.

One non-limiting example embodiment of a mirror 610 with a section 612 can be a linear polarizer in a polarization direction parallel to the linear polarization of the modulated polarized light 622, which is coated by a reflective coating on its surface facing the combined light 624, except at the section 612.

Another non-limiting example embodiment of a mirror 610 with a section 612 can be a linear polarizer in a polarization direction parallel to the linear polarization of the modulated polarized light 622, placed behind a mirror which has a non-reflecting section at the section 612.

In some embodiments, the first SLM 602 is used to produce a CGH image, focused at the mirror 610, and the second SLM 614 is used to produce a fill-in for the CGH image at the section of the CGH image removed by the section 612.

A resultant image viewed from a direction in which the light 626 is heading will show the CGH image, without a ZOD bright spot, and with the fill-in light.

In some embodiments the fill-in light is optionally modulated and polarized light 628 produced by the second SLM 614 and focused at the area of the section 612. The modulated and polarized light 628 is calculated to modulate light so as to produce a portion of the CGH image which is removed from the light of the first SLM 602 by the section 612. In some embodiments the portion of the CGH image is produced by using a second SLM 614 smaller than the first SLM 602, or by illuminating a partial area of a second SLM 614, since the area of the section 612 is smaller than the entire CGH image. The portion of the CGH image may itself potentially produce a ZOD bright spot, which, when produced from a small area than the first SLM 602, is potentially smaller in area and/or smaller in intensity than a ZOD bright spot which was produced by the first SLM and removed from the CGH image.

In some embodiments the fill-in light is optionally a spot of illumination produced by the second SLM 614 and focused at the area of the section 612. In some embodiments intensity of the spot of illumination produced by the second SLM 614 can be adjusted so as not to interfere with visual quality of the CGH image. In some embodiments the intensity is adjusted by computing an average intensity of the section of the CGH image produced by the first SLM 602, and causing the second SLM 614 to produce that intensity at the section 612 of the mirror 610. In some embodiments the intensity is adjusted by feedback—an imaging system is placed to view the CGH image, and provide instructions to the SLM 614 or an illuminator (not shown) illuminating the SLM 614, so that an area in the CGH image corresponding to the section 612 of the mirror 610 appears with a same light intensity as a surrounding area.

In some embodiments where the fill-in light from the second SLM 614 is optionally not polarized. The fill-in light is optionally made twice as intense as when using polarized illumination, and a portion of the fill-in light, by way of a non-limiting example half the fill-in light, is reflected by the sport 612, and approximately half of the fill-in light passes through the spot 612.

In some embodiments a polarization of the fill-in light is optionally transverse to a polarization of light for producing the CGH image.

In some embodiments, when a ZOD blocker blocks the ZOD, or when the ZOD bright spot is removed, and the ZOD bright spot is in a center of a CGH image, a viewer will see a black dot at the CGH image center. Optionally, a fill-in SLM can be placed in the optical system so that the fill-in SLM produces a CGH image that is similar to the CGH image that would have been seen in the CGH image center if the ZOD blocker or remover had not been introduced to the system. Optionally, only part of the fill-in SLM may be used, so that the ZOD bright spot of the fill-in SLM is optionally directed off axis, out of a direction of viewing the CGH image.

In some embodiments, several SLMs are used for filling in. More than one SLM or fill-in illuminators are optionally used to fill in light the ZOD areas.

In some embodiments an RGB amplitude LED display is imaged to a ZOD blocker area of the CGH image, equivalent to the section 612 shown in FIG. 6F, so that the LED display provides light at a same color and/or intensity as the CGH image has at the ZOD blocked area, optionally by using electronic management of the LED display. In some embodiment the LED display produces an image at the ZOD blocked area of the CGH image which merges color and amplitude with the adjacent CGH image.

In some embodiments, the fill-in is performed by forming a two-dimensional (2D) image of the area of the ZOD blocked spot of the CGH image.

Figure 6G:
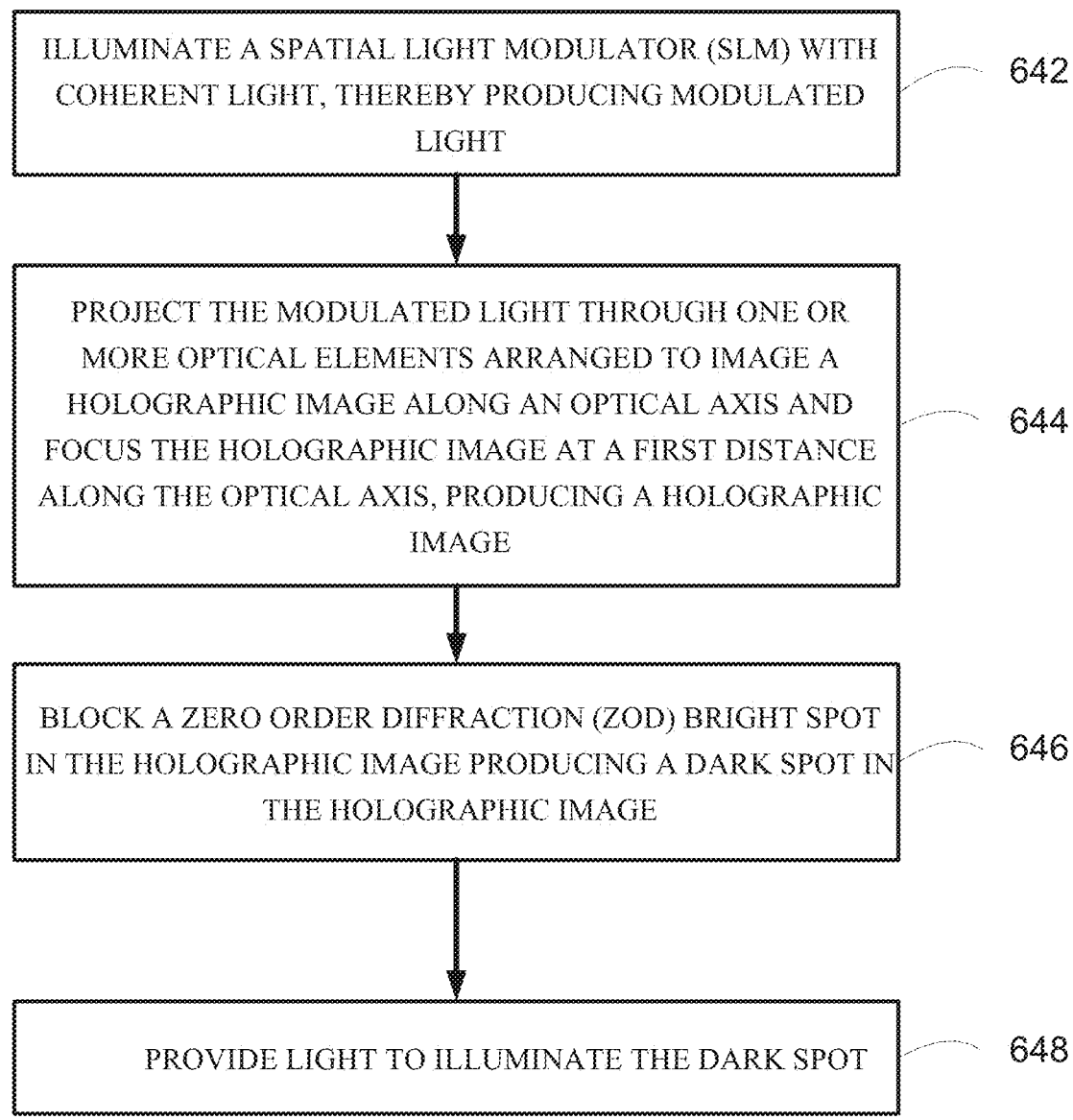
FIG. 6G is a simplified flow chart illustration of a method for displaying a holographic image according to an example embodiment of the invention.

Reference is now made to FIG. 6G, which is a simplified flow chart illustration of a method for displaying a holographic image according to an example embodiment of the invention.

The method of FIG. 6G includes:

illuminating a Spatial Light Modulator (SLM) with coherent light, thereby producing modulated light (642); and projecting the modulated light through one or more optical elements arranged to image a holographic image along an optical axis and focus the holographic image at a first distance along the optical axis, producing a holographic image (644);

blocking a Zero Order Diffraction (ZOD) bright spot in the holographic image producing a dark spot in the holographic image (646); and providing light to illuminate the dark spot (648).

In some embodiments the holographic image is a Fourier holographic image.

ZOD Blocking Using a Distributed Bragg Reflector (DBR)

A distributed Bragg reflector (DBR) is a reflector sometimes used in waveguides, such as optical fibers. It is a structure formed from multiple layers of alternating materials with varying refractive index, or by periodic variation of some characteristic (such as height) of a dielectric waveguide, resulting in periodic variation in the effective refractive index in the guide. Each layer boundary causes a partial reflection of an optical wave. For waves whose wavelength is close to four times the optical thickness of the layers, the many reflections combine with constructive interference, and the layers act as a reflector at the above-mentioned wavelength. A range of wavelengths that are reflected is called a photonic stopband. Within the photonic stopband, light is "forbidden" to propagate forward in the structure.

DBR are known to have selective reflection of optical waves at a specific wavelength and for a specific direction. This is optionally used to block the zero order diffraction light, optionally before a focusing lens.

In some embodiments, a DBR is used to block a plane wave of light reflected off a face of an SLM, which is light which would produce the ZOD bright spot. The DBR is specific to a wavelength of light and to an angle of light impinging upon it. Light with wavelength $\lambda$ impinging at an angle $\alpha$ to a normal to a face of the DBR is treated by the DBR as light having a wavelength $\lambda \cos(\alpha)$, which is slightly different than $\lambda$, and is therefore potentially not reflected or blocked, but allowed through.

An equation describing behavior of a DBR is the Bragg equation:

$$2\pi n \Lambda \cos(\theta) = m\lambda \qquad \text{Equation 2}$$

where $\Lambda$ is a distance between the DBR layers, n is a refractive index of the material of the DBR, $\theta$ is a relative angle between impinging light and a direction of a normal to the DBR layers, and $m\lambda$ is an integer number of wavelengths.

The specific angular response can be calculated according to textbooks such as above-mentioned "Optical Waves in Layered Media", Pochi Yeh, Wiley, 3 Mar. 2005—Science, pages 129-134.

When the SLM is used to produce a holographic image, the SLM produces light propagating at various angles. A portion of the light for producing the holographic image is blocked by the DBR, and another portion is allowed through.

In some embodiments, a DBR is placed on an optical axis of the light coming from the SLM prior to other optic elements, optionally prior to focusing optic elements, which may change direction of the light coming from the SLM.

In some embodiments, for example when three coherent light sources are used to produce a color holographic image, three DBR are placed on an optical axis of the light coming from the SLM, each one of the DBRs blocking on-axis light at a specific wavelength corresponding to one of the three coherent light sources, and allowing through light at other wavelengths.

Figure 7A:
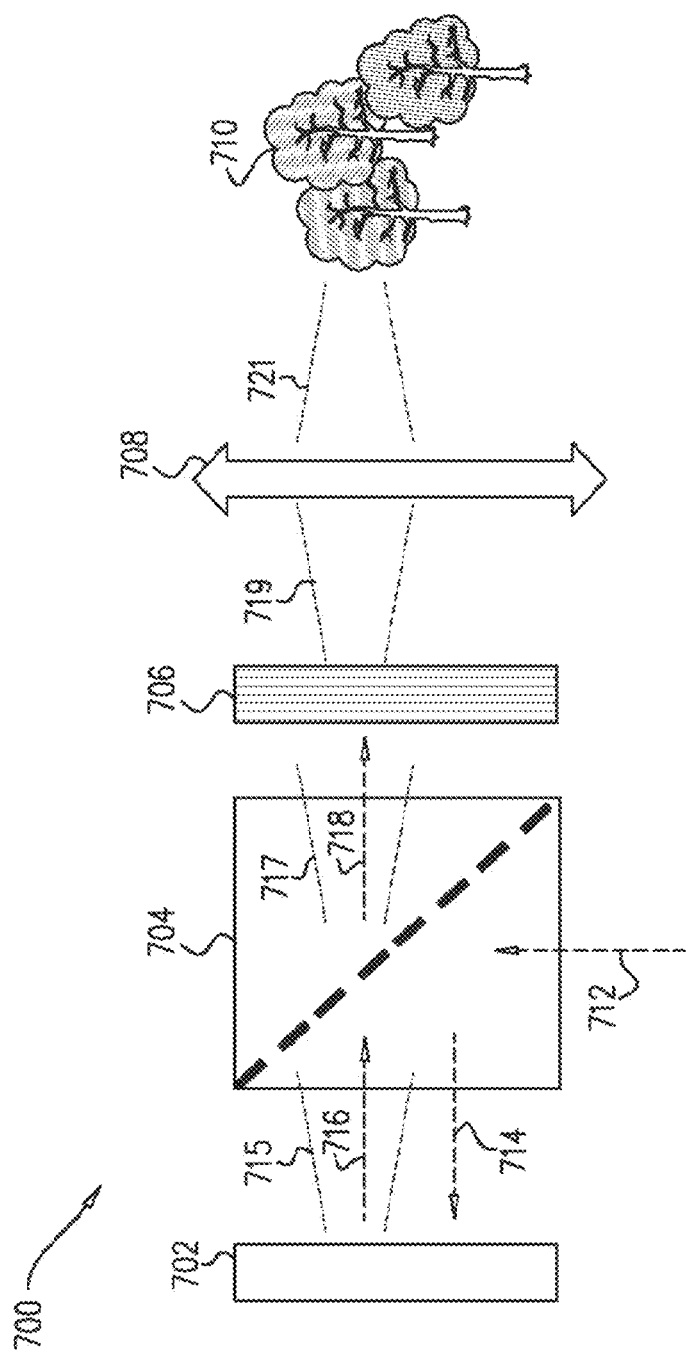
FIG. 7A is a simplified line drawing illustration of a system for displaying a holographic image using a distributed Bragg reflector (DBR) to block light for producing a ZOD bright spot according to an example embodiment of the invention.

Reference is now made to FIG. 7A, which is a simplified line drawing illustration of a system for displaying a holographic image using a distributed Bragg reflector (DBR) to block light for producing a ZOD bright spot according to an example embodiment of the invention.

FIG. 7A shows a system 700 for displaying a holographic image, including:
  a Spatial Light Modulator (SLM) 702;
  a beam splitter 704;
  a distributed Bragg reflector (DBR) 706; and
  an optional optical focusing element 708.

An example description of a light path through the system 700 is now provided:

Coherent light 712 enters the beam splitter 704, and is reflected as light 714 toward the SLM 702.

The SLM 702 reflects some of the light 714 as reflected light 716 from a face of the SLM 702, and produces modulated light, for producing a holographic image, which is drawn in FIG. 7A as a light cone 715.

The light 716 and the light cone 715 pass through the beam splitter 704 and onto the DBR 706, as light 718 and light cone 717 respectively.

The DBR 706 blocks the light 718, which represents an on-axis reflection of light 716 from a face of the SLM 702, and also an on-axis portion of the light from the light cone 717.

Light passes through the DBR and out the other side of the DBR 706 as a light cone 719, which includes of-axis light from the light cone 717, which corresponds to some of the modulated light cone 715 for producing a holographic image.

In some embodiments the light cone 719 is viewed by a viewer as displaying a holographic image 710.

In some embodiments the light cone 719 optionally passes through one or more focusing optical elements, such as the optional optical focusing element 708, and, when viewed by a viewer, displays the holographic image 710.

Figure 7B:
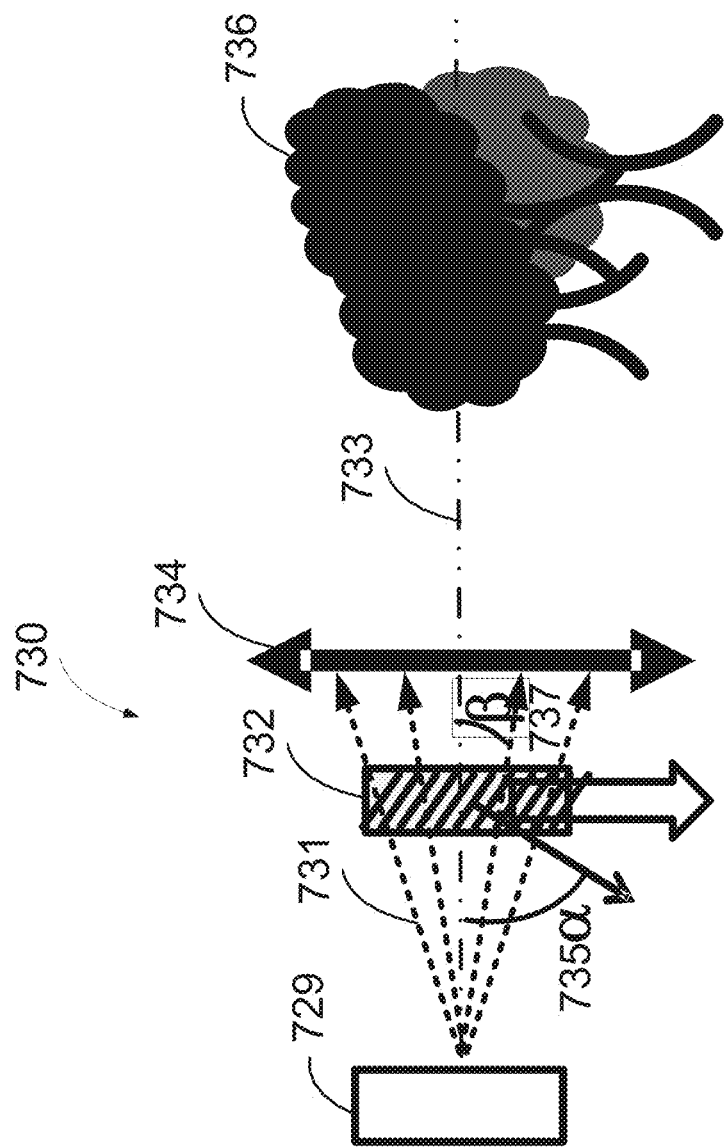
FIG. 7B is a simplified line drawing illustration of a system for displaying a holographic image using a distributed Bragg reflector (DBR) to block light for producing a ZOD bright spot according to an example embodiment of the invention.

Reference is now made to FIG. 7B, which is a simplified line drawing illustration of a system for displaying a holographic image using a distributed Bragg reflector (DBR) to block light for producing a ZOD bright spot according to an example embodiment of the invention.

FIG. 7B shows a system 730 for displaying a holographic image, including:
  a SLM 729;
  a distributed Bragg reflector (DBR) 732; and
  an optional optical focusing element 734.

An example description of a light path through the system 730 is now provided:

Coherent light 731 travels from the SLM 729, partly including modulated light, and partly as a plane-wave which is light which will produce the ZOD bright spot.

The coherent light 731 travels from the SLM 729 onto a DBR 732.

The DBR 732 reflects the plane-wave component of the light 731, and allows through all light that is not at the same wavelength and propagation direction as the plane wave component.

In some embodiments the BDR comprises multiple layers of materials with varying refractive index, a normal to a face of the layers at an inclination angle α 735 to an optical axis 733 of the system 730.

The plane-wave component of the light 731 which travels along the optical axis is reflected (not shown) at an angle 2·α from the DBR Portions of the light 731 at an angle β to the optical axis 733 pass through the DBR 732, optionally through the optional optical focusing element 734, and form a holographic image, without a ZOD bright spot, or at least with a reduced-intensity ZOD bright spot.

A DBR positioned after the SLM 729 and before the lens 734 eliminates light traveling along the optical axis at angles smaller than a diffraction angle β, and reduces a ZOD bright spot.

In some embodiments, such as when producing a Fresnel CGH image, there is no focusing lens such as the lens 734 along an optical path from the SLM 729 to the holographic image 736. A DBR positioned after the SLM 729, even without any focusing lens such as the lens 734, eliminates light traveling along the optical axis at angles smaller than a diffraction angle β, and potentially reduces background noise in the holographic image 736.

In some embodiments a Fresnel CGH image is produced by an optical system without using a lens such as the lens 734. In such systems there is no ZOD spot to block, yet plane wave blocking potentially reduces noise in the holographic image by blocking a reflection from a front face of the SLM 729.

In some embodiments, in order to achieve an angular filtering of light for angles greater than approximately β=1 mrad, a Photo-Thermo-Refractive (PTR) holographic element is optionally used, by way of a non-limiting example with a refractive index change in an order of magnitude of approximately $\sim 10^{-4}$ and with an order of magnitude of approximately 20,000 layers, each approximately 100 nm thick, for a total PTR component thickness of approximately 2 mm.

In some embodiments a DBR is used which has an inclination angle α 735 of the DBR layers.

In some embodiments an inclination angle α 735 is chosen, by way of a non-limiting example, to be at least α=20 degrees or greater.

In some embodiments, taking a typical refractive index of glass of ~1.5, a 30 degrees value for the angle α is selected.

In some embodiments the angle α is optionally implemented by tilting the DBR element with respect to the optical axis of an incident beam.

In some embodiments, the angle α is optionally implemented by tilting a writing procedure used to produce the DBR, for example in a PTR, relative to a direction of incident light in FIG. 7B α defines the DBR tilt it cannot be relative to the DBR it is the angle of the DBR with respect to the incident light. In some embodiments such an implementation is preferable, since the DBR may be placed normal to the optical axis and contributes less length to the optical system.

FIG. 7B shows an angle α>20 degrees.

An equation governing the DBR is the above-mentioned Bragg equation.

Some potential advantages of using a DBR to block a ZOD bright spot are:
  a length of the optical system can be made shorter than in some other embodiments described herein; and
  a DBR provides an ability to block the ZOD bright spot entirely, or almost entirely, while passing through much of the light for producing a holographic image, so the holographic image is without a dark spot which may require filling in, as described with reference to some other embodiments described herein.

In some embodiments, a ZOD bright spot size and shape are optionally calculated, optionally taking into account an optical configuration designed for projecting the holographic image. Typically for a square aperture SLM, the ZOD bright spot intensity is a sin c function in two transverse directions. In some embodiments a DBR is designed to produce a reflection function in Fourier space, at the focal plane, corresponding to the sin c function of the ZOD bright spot. In some embodiments the DBR is optionally designed to have a sin c response in an angular direction of propagation.

In some embodiments, spatial and/or temporal coherence desired of the coherent light source(s) are calculated and designed so as to provide light coherence equal to or better than required by the DBR to block on-axis light reflected from a face of the SLM.

Figure 7C:
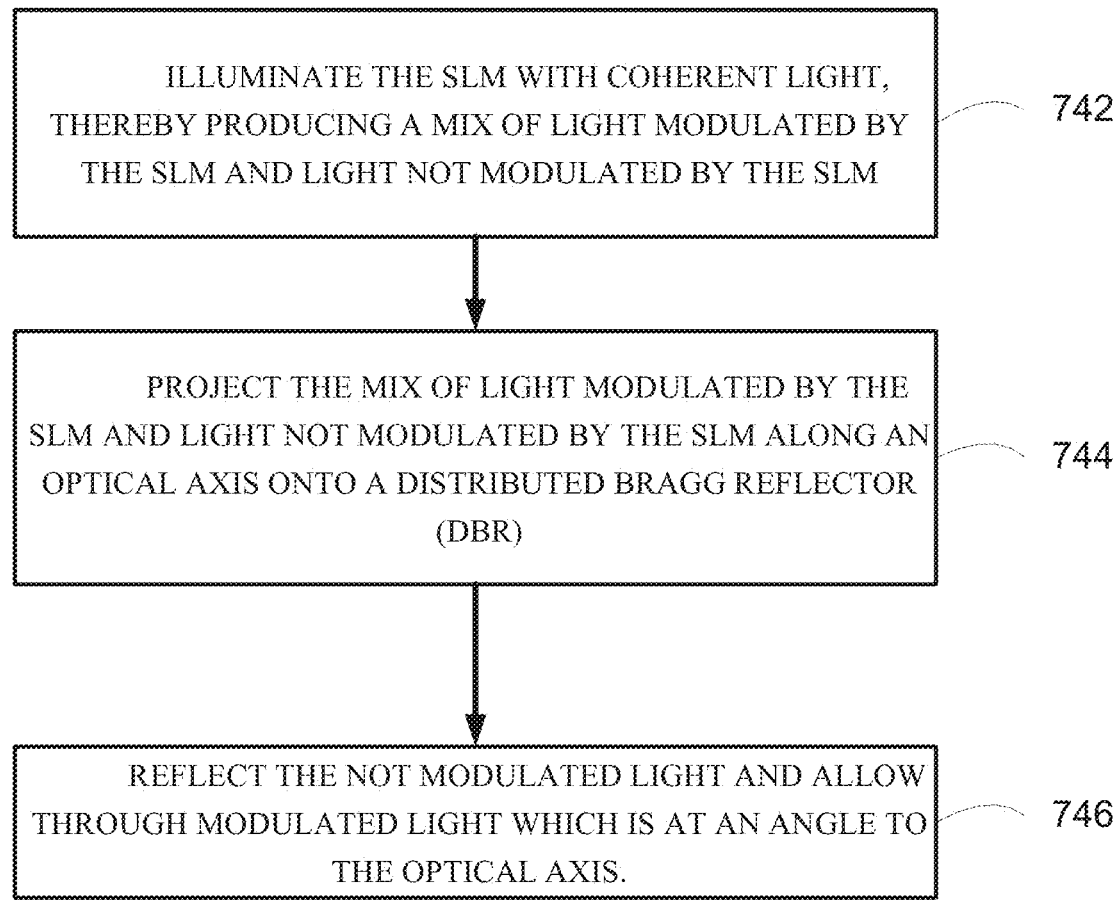
FIG. 7C is a simplified flow chart illustration of a method for blocking light reflected from a Spatial Light Modulator (SLM) and allowing through light for projecting a holographic image according to an example embodiment of the invention.

Reference is now made to FIG. 7C, which is a simplified flow chart illustration of a method for blocking non-modulated light from a Spatial Light Modulator (SLM) and allowing through modulated light for projecting a holographic image according to an example embodiment of the invention.

The method of FIG. 7C includes:

illuminating the SLM with coherent light, thereby producing light modulated by the SLM and light not modulated by the SLM (742); and projecting the mix of the modulated light and the not modulated light along an optical axis onto a distributed Bragg reflector (DBR) (744);

wherein the DBR reflects the not modulated light and allows through modulated light which is at an angle to the optical axis (746).

Using a Volume Grating to Diverge ZOD Away from Image

Figure 8A:
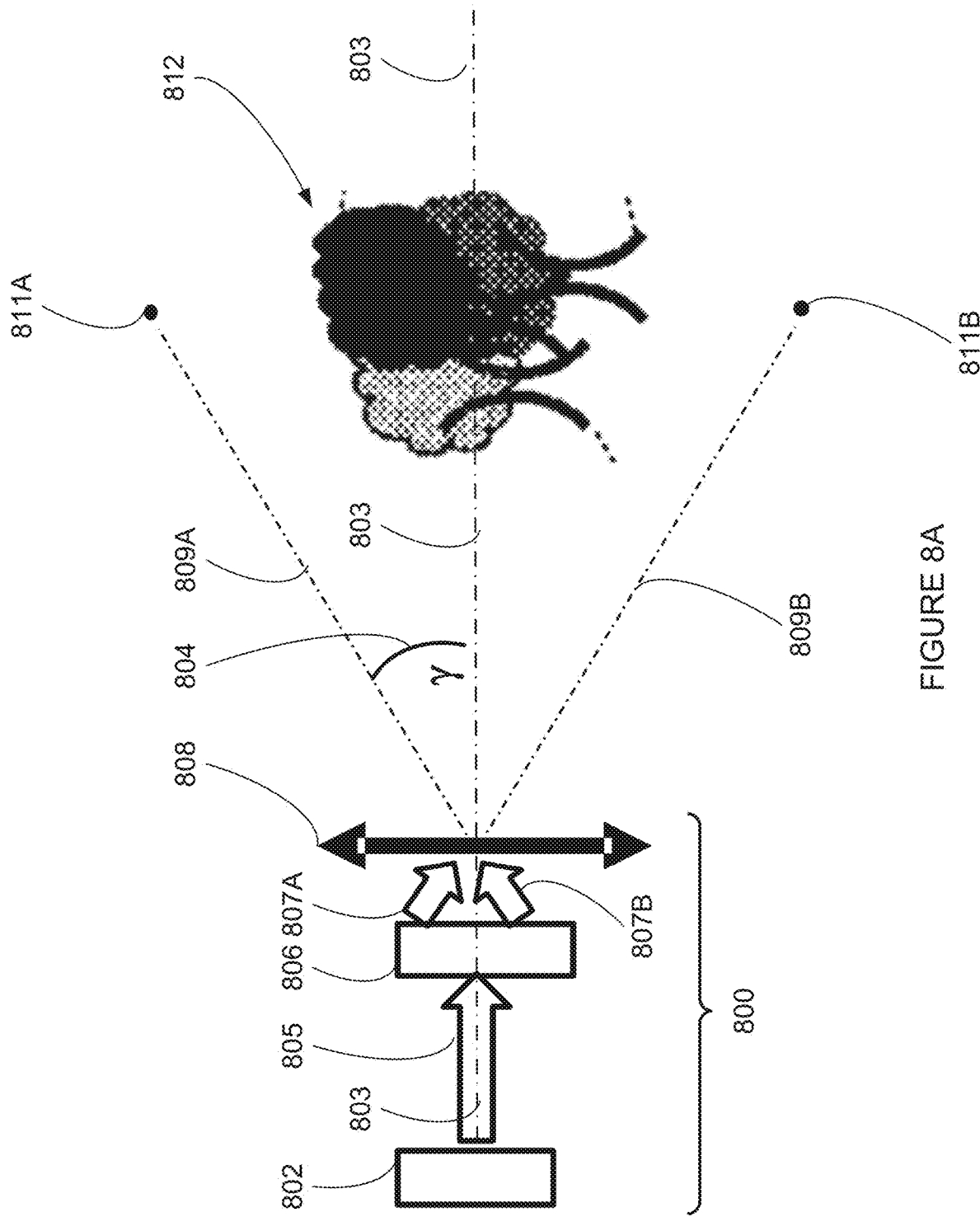
FIG. 8A is a simplified line drawing illustration of a system for displaying a holographic image using a volume grating to diverge light which may produce a ZOD bright spot away from the holographic image according to an example embodiment of the invention.

Reference is now made to FIG. 8A, which is a simplified line drawing illustration of a system for displaying a holographic image using a volume grating to diverge light which may produce a ZOD bright spot away from the holographic image according to an example embodiment of the invention.

The term volume grating is used in the present specification and claims to mean a volume distribution of modulated index of refraction.

In some embodiments the volume grating is a volume distribution has a modulated index of refraction having a thickness of more than 2 wavelengths of light, and more than 5, 10, 15, 20, 25, 50, 100, 200 500, 1,000 wavelength of light, more than 1 micron, 2 microns, and up to 5 millimeters thick and more.

In some embodiments, the volume grating may optionally be a 'Holographic Optical Element' (HOE) or a volume holographic grating.

In some embodiments, the volume grating is a volume grating having rotational symmetry.

A non-limiting example of a volume grating having rotational symmetry is a volume refractive index pattern produced by interference of a first plane-wave passing through, by way of a non-limiting example, a conical lens, and a second, reference plane-wave.

In some embodiments the conical lens is a lens type named axicon.

A plane-wave, when passing through a volume grating produced with a plano-convex axicon with a focal length of d, acquires phase in the form of:

$$\phi(r) = -(1+d^2/\rho^2)^{-1/2} r \quad \text{Equation 3}$$

where ρ is a radius of an aperture of the optical system, for example a radius of an SLM from which the plane-wave is coming, and r is the distance from the optical axis. Such a phase forms a ring pattern at a focal plane of a focusing lens.

FIG. 8A shows a non-limiting example embodiment of a system 800 for displaying a holographic image, including:

a SLM 802;

a volume grating 806; and an optional optical focusing element 808.

A description of a light path through the system 800 is now provided:

Coherent light travels from the SLM 802, including a first component (not shown) of modulated light for producing a holographic image 812, and a second component 805 of a plane-wave 805 which is light which potentially produces a ZOD bright spot.

The coherent light travels from the SLM 802, along a direction of an optical axis 803, onto the volume grating 806.

The volume grating 806 interacts with the plane-wave component 805 of the coherent light, diffracting the plane-wave 805 to emerge as light 807A 807B.

The volume grating 806 allows through at least a portion of the first component of modulated light for producing a holographic image 812, at least the portion which is not at a same wavelength and/or propagation direction as the plane-wave component 805.

The portion of the first component of modulated light for producing a holographic image 812 passes through the optional optical focusing element 808, and forms the holographic image 812.

The plane-wave component 805 is diffracted by the volume grating 806 to directions at an angle γ 804 from the optical axis 803, including rays to the example directions 807A 807B, which pass through the optional optical focusing element 808, and form an image of a ring at a focal plane of the optional optical focusing element 808.

FIG. 8A shows the image of the ring as two points 811A and 811B. The two points 811A 811B show where the image of the ring would impinge upon a plane of the drawing of FIG. 8A.

In some embodiments, the volume grating 806 is optionally made, optionally by producing the volume grating 806, so that an angle of diffraction that defines the ring radius r is γ=φ(r)/r is greater than a maximal diffraction angle of the SLM 802, potentially separating the ring image of the ZOD bright area from the holographic image 812.

In some embodiments, the volume grating 806 has a three dimensional volume pattern formed by an interference pattern between a plane wave passing through an optical element having a conic body such as an axicon and a plane-wave. In such embodiments the angle γ 804 of is linked to a head angle β of the optical element as follows:

$$\beta = \pi - \frac{2\gamma}{n-1} \quad \text{Equation 4}$$

where n is a refractive index of the optical element.

Additional details about properties of example embodiments of the volume grating 806 are provided below, with reference to FIG. 8B.

In some embodiments light modulated by the SLM (not shown) is mostly not diverged by the volume grating, and optionally forms the holographic image 812, at a center of the ZOD bright ring.

In some embodiments, light diverging to the bright ring is optionally blocked, optionally using an aperture field stop, with the aperture designed to block light in a direction of the ZOD bright ring and allow through light in a direction of the holographic image 812.

In some embodiments the axicon-based volume grating 806 is replaced by some other volume grating with a volume pattern having rotational symmetry, In some embodiments the volume grating 806 is made of multiple layers of materials, with a varying refractive index, with a three dimension volume pattern formed by an interference pattern between a plane wave passing through an axicon and a plane-wave.

In some embodiments the volume grating optical element optionally has a pattern similar to an interference pattern of a plane-wave passing through a lens and a reference plane-wave. Such an optical element optionally focuses a ZOD bright spot or ring at a different distance along the optical axis than a distance where the holographic image is focused.

Optionally the volume grating optical element 806 diffracts the ZOD to a range of angles greater than the maximal diffraction angle of the SLM. Under such a configuration the ZOD light passing through the optional optical focusing element 734, optionally forming a ring around and outside the holographic image.

In some embodiments light passing the SLM also passes through a telescope configuration in which a maximal diffraction angle of the SLM is de-magnified. In such a case the volume grating diffracts the ZOD to angles greater than a maximal de-magnified diffraction angle of the SLM.

Figure 8B:
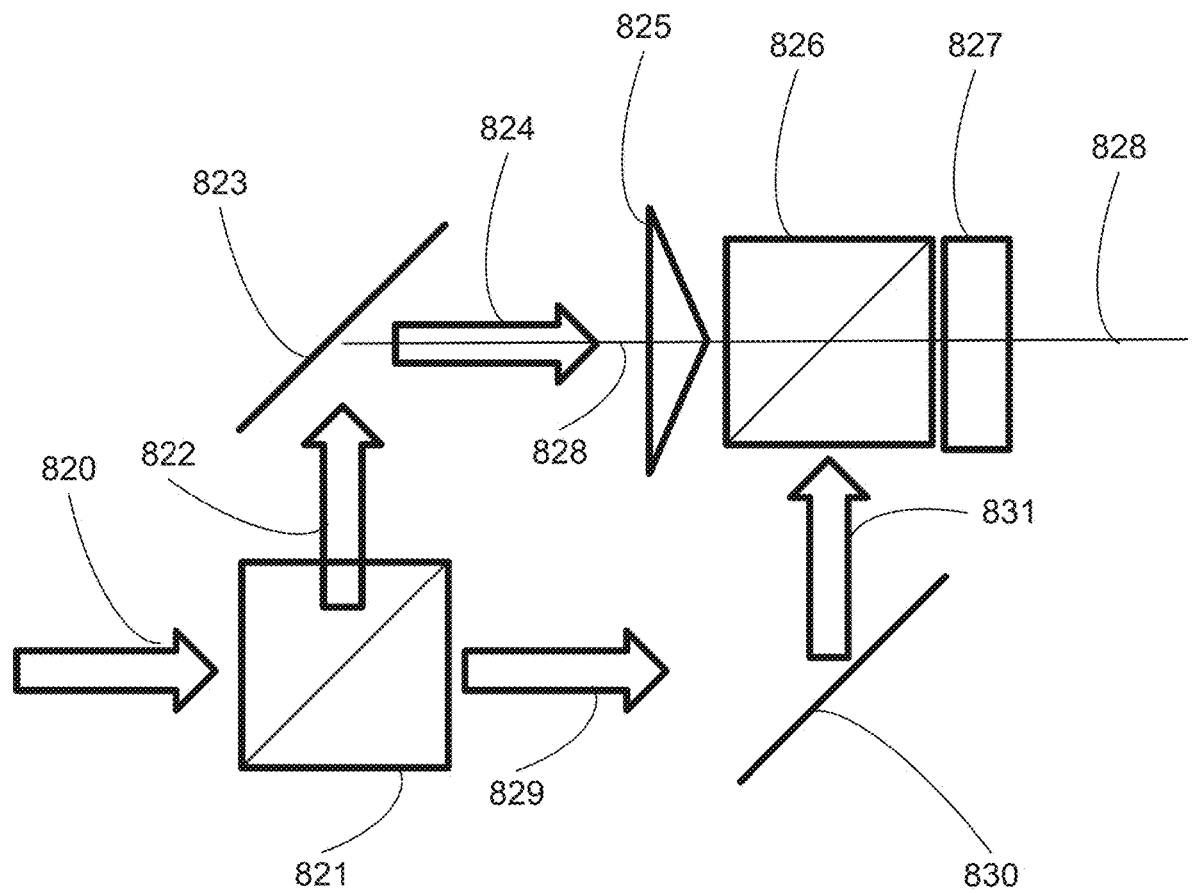
FIG. 8B is a simplified line drawing illustration of a system for producing the volume grating of FIG. 8A according to an example embodiment of the invention.

Reference is now made to FIG. 8B, which is a simplified line drawing illustration of a system for producing the volume grating of FIG. 8A according to an example embodiment of the invention.

FIG. 8B shows a non-limiting example of a recording schema of an axicon-based volume grating pattern on holographic recording media.

Some non-limiting examples of holographic recording media include photorefractive polymer, photographic emulsions, dichromated gelatin, photoresists, photothermoplastics, photopolymers and additional photorefractive materials.

FIG. 8B shows coherent plane-wave light 820 split to two directions 822 829 by a beam splitter 821.

The light in a first direction 822 is directed as light 824 through a conical lens 825, optionally by reflection off a mirror 823, and through a beam combiner 826.

In some embodiments the light 824 passes through the conical lens 825 in a direction parallel to an optical axis 828 of the conical lens 825. In such embodiments a resultant volume grating optionally produces a ZOD ring which is symmetric around an optical axis such as the optical axis 803 of FIG. 8A

In some embodiments the light 824 passes through the conical lens 825 in a direction at an angle (not shown) to the optical axis 828 of the conical lens 825. In such embodiments a resultant volume grating optionally produces a ZOD ring which is assymetric around an optical axis such as the optical axis 803 of FIG. 8A.

The light in a second direction 829 is directed as light 831, optionally by reflection off a mirror 830, to a beam combiner 826.

Combined light from the beam combiner 826 enters a holographic recording medium 827, and a volume interference pattern of the combined light is recorded.

The volume interference pattern of the two recombined beams is optionally recorded on the holographic recording medium 827 as a modulated refractive index. The holographic recording medium 827 records and produces a volume grating which is useful for diverging the ZOD bright spot away from a holographic image.

In some embodiments the volume grating reflects the ZOD bright spot.

In some embodiments other optical elements are used in place of the conical lens 825 for producing the volume grating using the holographic recording medium 827. Some non-limiting examples of such optical elements include conic solids and conic solids formed by connecting a polygonal base and a point called the apex, such as a three-sided pyramid, a four-sided pyramid, and a many-sided pyramid.

In some embodiments, in order for the angle γ 804 of FIG. 8A to be greater than $\theta_d$, defined as a maximal diffraction angle of the SLM the angle, the head angle β of an optical element in the shape of the conical lens or pyramid lens is selected to be larger than $$\beta = \pi - \frac{2 * \theta_d}{n - 1}$$ Equation 5 where n is a refractive index of the optical element.

In some embodiments producing a volume grating for diverging the ZOD bright spot away from a holographic image is produced by recording a volume grating produced by an SLM modulating light onto a holographic recording medium. Optionally, the SLM forms an interference pattern corresponding to a holographic optical element such as the conic solids described above.

In some embodiments additional methods for producing a volume grating for diverging the ZOD bright spot away from a holographic image are contemplated, by recording a volume grating produced by direct local patterning on glass, for example by using a UV laser.

It is expected that during the life of a patent maturing from this application many relevant Spatial Light Modulators (SLMs) will be developed and the scope of the term SLM is intended to include all such new technologies a priori.

As used herein the term "about" refers to ±20%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for directing non-modulated light from a Spatial Light Modulator (SLM) and allowing through modulated light for producing an interference based holographic image, the method comprising:
    illuminating the SLM with coherent light, thereby producing a mix of light modulated by the SLM and light not modulated by the SLM; and
    projecting the mix of the modulated light and the not modulated light along an optical axis onto a volume grating;
wherein
    the volume grating directs the not modulated light away from the holographic image and allows through modulated light for producing the holographic image;
    the volume grating is arranged to diffract Zero Order Diffraction light at an angle larger than a maximal diffraction angle of the SLM relative to the optical axis;
    the volume grating comprises an interference pattern of a first plane wave interfering with a second plane wave which has passed through an optical element in a shape of a conic solid; and
    a head angle $\beta$ of the optical element in a shape of a conic solid is larger than $$\beta = \pi - \frac{2*\theta_d}{n-1}$$

where n is a refractive index of the optical element.

2. The method of claim 1, in which the volume grating allows through modulated light which is at an angle to the optical axis which is greater than 1 milliradian.

3. The method of claim 1, wherein the volume grating comprises an interference pattern having a rotational symmetry.

4. The method of claim 1, wherein the volume grating comprises an interference pattern of a first plane wave interfering with a second plane wave which has passed through an optical element in a shape of a conic solid.

5. The method of claim 1, wherein the volume grating comprises an interference pattern of a first plane wave interfering with a second plane wave which has passed through an optical element in a shape of a conical lens.

6. The method of claim 1, wherein the volume grating comprises an interference pattern of a first plane wave interfering with a second plane wave which has passed through an optical element in a shape of a pyramidal solid.

7. The method of claim 1, wherein the volume grating pattern comprises an interference pattern of a first plane wave interfering with a second plane wave which has passed through an optical element with an axis parallel to a direction of propagation of the second plane wave.

8. The method of claim 1, and further comprising passing light from the SLM through a magnifying lens array,
    wherein the volume grating is arranged to diffract Zero Order Diffraction light at angles larger than the SLM de-magnified maximal diffraction angle relative to the optical axis.

9. Apparatus for displaying an interference based holographic image and directing non-modulated light away from the holographic image, comprising:
    an SLM for modulating coherent light to produce an interference based holographic image; and
    a volume grating for directing non-modulated coherent light away from the holographic image,
wherein:
    the volume grating is arranged to diffract Zero Order Diffraction light at an angle larger than a maximal diffraction angle of the SLM relative to the optical axis;
    the volume grating comprises an interference pattern of a first plane wave interfering with a second plane wave which has passed through an optical element in a shape of a conic solid; and
    a head angle $\beta$ of the optical element in a shape of a conic solid is larger than $$\beta = \pi - \frac{2*\theta_d}{n-1}$$

where n is a refractive index of the optical element.

10. The apparatus of claim 9, in which the volume grating is designed to allow through modulated light which is at an angle greater than 1 milliradian to the optical axis.

11. The apparatus of claim 9, wherein the volume grating comprises an interference pattern having a rotational symmetry.

12. The apparatus of claim 9, wherein the volume grating comprises an interference pattern of a first plane wave interfering with a second plane wave which has passed through an optical element in a shape of a conic solid.

13. The apparatus of claim 9, wherein the volume grating comprises an interference pattern of a first plane wave interfering with a second plane wave which has passed through an optical element in a shape of a conical lens.

14. The apparatus of claim 9, wherein the volume grating comprises an interference pattern of a first plane wave interfering with a second plane wave which has passed through an optical element in a shape of a pyramidal lens.

15. The apparatus of claim 9, wherein the volume grating pattern comprises an interference pattern of a first plane wave interfering with a second plane wave which has passed through an optical element with an axis parallel to a direction of propagation of the second plane wave.

16. The apparatus of claim 9, wherein the volume grating is arranged to diffract Zero Order Diffraction light at angles larger than the SLM de-magnified maximal diffraction angle relative to the optical axis.

* * * * *